US009898723B2

(12) United States Patent
Rutherford et al.

(10) Patent No.: US 9,898,723 B2
(45) Date of Patent: Feb. 20, 2018

(54) SYSTEM AND METHOD FOR VOICE AUTHENTICATION

(71) Applicants: Robert Rutherford, San Francisco, CA (US); Julian Hua, Moraga, CA (US)

(72) Inventors: Robert Rutherford, San Francisco, CA (US); Julian Hua, Moraga, CA (US)

(73) Assignee: Visa International Service Association, San Francisco, CA (US)

( * ) Notice: Subject to any disclaimer, the term of this patent is extended or adjusted under 35 U.S.C. 154(b) by 424 days.

(21) Appl. No.: 14/132,576

(22) Filed: Dec. 18, 2013

(65) Prior Publication Data

US 2014/0172430 A1     Jun. 19, 2014

Related U.S. Application Data

(60) Provisional application No. 61/739,464, filed on Dec. 19, 2012.

(51) Int. Cl.
*G10L 17/00*     (2013.01)
*G06Q 20/20*     (2012.01)
(Continued)

(52) U.S. Cl.
CPC ............ *G06Q 20/20* (2013.01); *G06F 21/32* (2013.01); *G06Q 20/32* (2013.01);
(Continued)

(58) Field of Classification Search
CPC ......... G10L 17/24; G10L 17/22; G10L 17/26; G10L 17/14; G10L 19/018; G10L 15/00;
(Continued)

(56) References Cited

U.S. PATENT DOCUMENTS 5,608,784 A     3/1997    Miller
5,940,476 A *   8/1999    Morganstein ........... G10L 17/22
                                                          379/265.01
(Continued)

FOREIGN PATENT DOCUMENTS

KR     1020030025962     3/2003
KR     1020120040690     4/2012
(Continued)

OTHER PUBLICATIONS

International Preliminary Report on Patentability for International Patent Application No. PCT/US2013/076233, dated Jul. 2, 2015, 8 pages.
(Continued)

*Primary Examiner* — Abdelali Serrou
(74) *Attorney, Agent, or Firm* — Kilpatrick Townsend & Stockton LLP

(57) ABSTRACT

Embodiments of the invention provide for secure voice authentication through a communication device or access device. Certain embodiments allow for providing a word string to a communication device or authentication device. The communication or authentication device plays a supplemental signal that is unique to a transaction. The communication device or authentication device concurrently records an audio segment originating from the user and the supplemental signal. The audio segment is an attempt by the user to vocally reproduce the word string. The communication device or authentication device sends the concurrently recorded audio segment and supplemental signal, to a computer, where the computer authenticates the user.

18 Claims, 11 Drawing Sheets

(51) Int. Cl.
*G06Q 20/32* (2012.01)
*G06Q 20/40* (2012.01)
*G06F 21/32* (2013.01)

(52) U.S. Cl.
CPC ... *G06Q 20/3272* (2013.01); *G06Q 20/40145* (2013.01); *G10L 17/00* (2013.01); *G10L 17/005* (2013.01)

(58) Field of Classification Search
CPC ..... G10L 19/0212; G10L 15/26; G10L 17/00; G10L 17/005; G10L 17/02; G10L 21/10; G10L 25/69; G10L 17/04; G10L 17/10; G10L 17/12; G10L 17/20; G10L 13/027; G10L 13/08; G10L 15/02; G10L 15/063; G10L 15/22; G10L 17/06; G06F 7/023; G06F 17/30743; G06F 21/00; G06F 21/16; G06F 21/60; G06F 2221/07; G06F 2221/2103; G06F 2221/2105; G06F 2221/2111; G06F 2221/2147; G06F 3/0482; G06F 3/0484; G06F 3/0485; G06F 3/0488; G06F 3/167; G06F 21/32; G06F 21/44; G06F 21/445; G06F 21/36; G06F 21/31; G06F 21/6245
See application file for complete search history.

(56) References Cited

U.S. PATENT DOCUMENTS

| | | | | |
|---|---|---|---|---|
| 6,246,987 B1* | 6/2001 | Fisher | ............... | H04M 3/42204 704/247 |
| 6,266,640 B1 | 7/2001 | Fromm | | |
| 6,292,782 B1* | 9/2001 | Weideman | ............ | G06Q 20/425 704/273 |
| 6,337,899 B1* | 1/2002 | Alcendor | ............. | H04Q 3/0029 370/263 |
| 6,389,397 B1* | 5/2002 | Otto | ............... | G10L 17/24 704/270 |
| 6,477,500 B2* | 11/2002 | Maes | ............... | G10L 15/065 704/246 |
| 6,529,871 B1* | 3/2003 | Kanevsky | ............... | G10L 17/22 379/88.02 |
| 6,556,127 B1* | 4/2003 | Moser | ............... | G07C 9/00158 340/5.22 |
| 6,681,205 B1* | 1/2004 | San Martin | ............ | G10L 17/24 704/243 |
| 6,853,716 B1* | 2/2005 | Shaffer | ............... | H04M 3/56 370/260 |
| 7,801,288 B2 | 9/2010 | Wasserblat et al. | | |
| 8,082,448 B2* | 12/2011 | Vandervort | ............ | G06F 21/32 713/186 |
| 8,380,161 B2 | 2/2013 | Ewell, Jr. | | |
| 2003/0009333 A1* | 1/2003 | Sharma | ............... | G10L 15/04 704/246 |
| 2003/0046083 A1 | 3/2003 | Edward, Jr. et al. | | |
| 2004/0225499 A1* | 11/2004 | Wang | ............... | H04M 3/4936 704/257 |
| 2007/0055517 A1* | 3/2007 | Spector | ............... | G06F 21/32 704/246 |
| 2007/0233483 A1* | 10/2007 | Kuppuswamy | ......... | G10L 17/20 704/247 |
| 2008/0059176 A1* | 3/2008 | Ravi | ............... | G10L 17/10 704/250 |
| 2008/0134317 A1* | 6/2008 | Boss | ............... | G06F 21/31 726/18 |
| 2008/0177550 A1* | 7/2008 | Mumm | ............... | G06F 21/32 704/273 |
| 2008/0192901 A1* | 8/2008 | Mumm | ............... | G10L 17/22 379/88.02 |
| 2008/0195389 A1* | 8/2008 | Zhang | ............... | G10L 17/24 704/246 |
| 2008/0281600 A1* | 11/2008 | Kuppuswamy | ......... | G10L 17/22 704/273 |
| 2009/0025071 A1* | 1/2009 | Mumm | ............... | G06F 21/32 726/7 |
| 2009/0063866 A1* | 3/2009 | Navratil | ............... | G06F 21/32 713/186 |
| 2009/0083847 A1* | 3/2009 | Fadell | ............... | G06F 21/316 726/16 |
| 2009/0083850 A1* | 3/2009 | Fadell | ............... | G06F 21/316 726/19 |
| 2011/0219427 A1* | 9/2011 | Hito | ............... | G06F 21/00 726/3 |
| 2012/0245941 A1* | 9/2012 | Cheyer | ............... | G10L 17/24 704/246 |
| 2012/0253810 A1* | 10/2012 | Sutton | ............... | G10L 17/24 704/246 |
| 2013/0203345 A1* | 8/2013 | Fisher | ............... | H04B 1/3816 455/41.1 |
| 2013/0225128 A1* | 8/2013 | Gomar | ............... | H04W 12/06 455/411 |

FOREIGN PATENT DOCUMENTS

| | | |
|---|---|---|
| WO | 00/29920 | 5/2000 |
| WO | 2014100236 | 6/2014 |

OTHER PUBLICATIONS

Singapore Application No. 11201504186U, Written Opinion dated Mar. 23, 2016, 8 pages.
International Search Report and Written Opinion for International Patent Application No. PCT/US2013/076233, dated Apr. 21, 2014, 10 pages.

* cited by examiner

SYSTEM AND METHOD FOR VOICE AUTHENTICATION

CROSS-REFERENCES TO RELATED APPLICATIONS

The present application is a non-provisional application of and claims priority to U.S. Provisional Application No. 61/739,464, filed on Dec. 19, 2012, the entire contents of which are herein incorporated by reference for all purposes.

BACKGROUND

A number of instances have occurred where a cardholder may wish to make a purchase with their communication device or initiate some other type of e-commerce transaction from their communication device. However, these types of purchases/transactions inherently carry a high risk because the cardholder does not use their physical payment card to complete the purchase/transaction. As such, many card issuers or merchants may wish to have an extra level of security to verify the identity of the cardholder wishing to complete the purchase/transaction with their communication device. Current solutions have attempted to use voice authentication to verify the identity of the cardholder. However, these solutions are vulnerable to replay attacks because the user's voice could easily be recorded and replayed by fraudsters.

Embodiments of the invention address this and other problems, both individually and collectively.

SUMMARY

Embodiments of the invention broadly described, allow for user voice authentication. More specifically, the invention pertains to transactions initiated from a communication device, such as a mobile phone or personal computer, for both face-to-face and remote payment environments.

Embodiments of the present invention relate to systems and methods for performing voice authentication for a user at a communication device or access device. A user may initiate a financial transaction from his/her communication device or at a access device, such as a payment terminal. The user may then be asked to provide a voice sample by speaking a certain word or phrase. Concurrent to the user speaking the word or phrase, the communication device or payment terminal may emit a supplemental signal, such as an inaudible sound, received from the payment processor, via the speaker of the communication device or payment terminal. The microphone of the communication device or payment terminal may capture the supplemental signal along with the spoken word/phrase and send the captured voice sample and supplemental signal along with transaction information to the acquirer who forwards it to the payment processor. The payment processor may verify that the supplemental signal received is the same as the one initially sent to the communication device. If the payment processor determines a match between the received inaudible sound and the initially sent supplemental signal, the user may be authenticated accordingly.

One embodiment of the invention is directed to a method for authenticating a user for a transaction comprising providing, by a device, a word string. The method includes playing, by the device, a supplemental signal unique to the transaction. The method further includes concurrently recording, by the device, an audio segment originating from the user and the supplemental signal, wherein the audio segment is an attempt by the user to vocally reproduce the word string. The method additionally includes, sending, by the device the concurrently recorded audio segment and supplemental signal, to a computer, wherein the computer authenticates the user.

Another embodiment of the invention is directed to a device comprising a processor, and a computer readable medium coupled to the processor. The computer readable medium comprises code, executable by the processor, for implementing the above-described method.

Another embodiment of the invention is directed to a method for authenticating a user for a transaction including receiving, by a server computer, an audio segment and supplemental signal unique to the transaction, wherein the audio segment and supplemental signal were concurrently recorded by a device and the audio segment originates from the user and is an attempt by the user to vocally reproduce a word string provided by the device. The method also includes verifying, by the server computer, that the supplemental signal received in the payment authorization request matches the supplemental signal provided to the device.

Another embodiment of the invention is directed to a device comprising a processor, and a computer readable medium coupled to the processor. The computer readable medium comprises code, executable by the processor, for implementing the above-described method.

It can be appreciated that while the discussion herein describes examples using a payment card and a cardholder, the payment card may be generically referred to as any payment instrument and the cardholder may be generically referred to as a user in other embodiments (where a card is not present).

These and other embodiments of the invention are described in further detail below.

DETAILED DESCRIPTION

Figure 1:
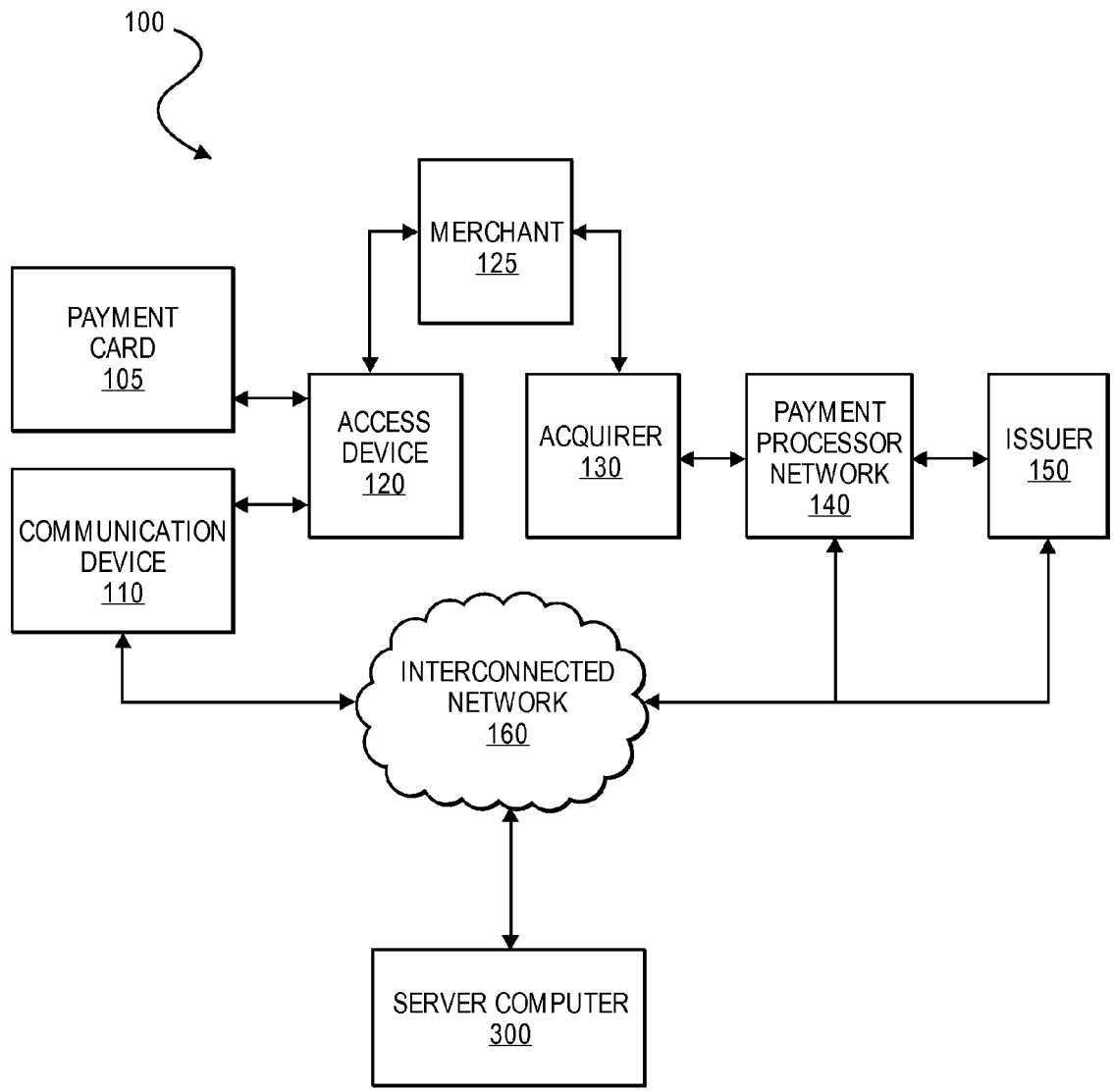
FIG. 1 is a block diagram of a payment system, according to an embodiment of the present invention.

Prior to discussing the specific embodiments of the invention, a further description of some terms can be provided for a better understanding of embodiments of the invention.

A "payment device" may include any suitable device capable of making a payment. For example, a payment device can include a card including a credit card, debit card, charge card, gift card, or any combination thereof. A payment device can be used in conjunction with a communication device, as further defined below.

A "payment processing network" (e.g., VisaNet™) may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments system) which processes authorization requests and a Base II system which performs clearing and settlement services.

A "server computer" can be a powerful computer or a cluster of computers. For example, the server computer can be a large mainframe, a minicomputer cluster, or a group of servers functioning as a unit. In one example, the server computer may be a database server coupled to a Web server.

An "access device" (e.g. a point-of-service (POS) terminal) can be any suitable device configured to process payment transactions such as credit card or debit card transactions, or electronic settlement transactions, and may have optical, electrical, or magnetic readers for reading data from other portable communication devices such as smart cards, keychain device, cell phones, payment cards, security cards, access cards, and the like.

An "acquirer" is a business entity (e.g., a commercial bank) that typically has a business relationship with the merchant and receives some or all of the transactions from that merchant.

An "issuer" is a business entity which issues a card to a user. Typically, an issuer is a financial institution.

A "cardholder" is a type of user that is authorized to use a payment card issued by the issuer. The terms "cardholder" and "user" may be used interchangeably in the following description. A "user" and/or "cardholder" may be any competent individual.

"Speaker recognition" is the identification of a user who is speaking based on characteristics of their voice (voice biometrics). Speaker recognition uses the acoustic features of speech that have been found to differ between individuals. These acoustic patterns reflect both anatomy (e.g., size and shape of the throat and mouth) and learned behavioral patterns (e.g., voice pitch, speaking style).

"Speech recognition" is the translation of spoken words into text understandable by a computer system. Speech recognition combined with speaker recognition may simplify the task of translating speech in systems that are used to authenticate or verify the identity of a speaker as part of a security process.

"Voice recognition" may be used to describe both "speaker recognition" and "speech recognition".

A "voice profile," as described herein, can be a profile or model representing a risk factor associated with a user. The voice profile may contain information about current and prior user authentications with a verification system. For example, the voice profile may contain the time, location, voice data, and match score associated with each particular voice authentication with the verification system by the user. The combination of information within the voice profile about prior authentications may be used to determine the risk factor associated with the user.

A "word string," as described herein, can be a combination of a number of words arranged in a particular order. A user may be requested to repeat a prompt for authentication purposes. The terms "prompt" and "word string" may be used interchangeably in the following description.

"Voice data" or a "voice sample," as described herein, can be captured digital audio data of a user's voice. For example, a voice sample may be a captured digital data signal of a user who wishes to authenticate with a transaction system. The user may be requested to repeat a certain prompt. The microphone may capture the prompt repeated by the user and pass the audio data to another module for speaker verification. The terms "voice sample," "voice data," and "audio segment" may be used interchangeably in the following description.

A "match score," as described herein, can be a relationship between received input data and stored data. In the context of the present invention, the received input data can be a captured voice sample. The stored data can be a previously captured and stored voice sample. The match score may express the degree of confidence between the received input data and the stored data. The match score may be passed to other parts of a risk scoring mechanism, such that the match score contributes along with other risk parameters to an overall decision, for example, approving or declining a transaction. Setting an appropriate threshold to ensure an acceptable level of accuracy would be appreciated by one of ordinary skill in the art. This concept can be applied to other biometric data apart from voice samples (e.g., retinal scans, facial recognition data, etc.).

A "supplemental signal," as described here, can be any signal that may be output by the communication device or access terminal concurrent to the user performing voice authentication. The supplemental signal may include an inaudible sound or an audible sound, or some other signal that may be played back using a microphone of the device.

A "communication device," as described herein, can be any electronic communication device that can execute and/or support electronic communications including, but not limited to, payment transactions. Some examples include a personal digital assistant (PDA), a smart phone, tablet computer, notebook computer, and the like.

An "authorization request message" may be an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

As used herein, a "communications channel" may refer to any suitable path for communication between two or more entities. Suitable communications channels may be present directly between two entities such as a payment processing network and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of a secure socket layer (SSL) session. However, any method of creating a secure channel may be used. By establishing a secure channel, sensitive information related to a payment device (such as account numbers, CVV values, expiration dates, etc.) may be securely transmitted between the two or more entities to facilitate a transaction.

I. Exemplary Systems

FIG. 1 is a block diagram of a payment system 100, according to one embodiment of the present invention. The system 100 includes a payment device 105, a communication device 110, an access device 120, a merchant 125, an acquirer 130, a payment processing network 140, an issuer 150, and an interconnected network 160. The acquirer 130 may further include an acquirer computer (not shown). The payment processing network 140 may include an authorization and settlement server and/or additional servers (not shown) to carry out the various transactions described herein.

In an embodiment, the communication device 110 is in electronic communication with the access device 120. The communication device 110 can be a personal digital assistant (PDA), a smart phone, tablet computer, notebook computer, or the like, that can execute and/or support payment transactions with a payment system 100. A communication device 110 can be used in conjunction with a payment card 105, such as a credit card, debit card, charge card, gift card, or other payment device and/or any combination thereof. The combination of a payment card 105 (e.g., credit card) and the communication device 110 (e.g., smart phone) can be referred to as the communication device 110 for illustrative purposes. In other embodiments, the communication device 110 may be used in conjunction with transactions of currency or points (e.g., points accumulated in a particular software application). In further embodiments, the communication device 110 may be a wireless device, a contactless device, a magnetic device, or other type of payment device that would be known and appreciated by one of ordinary skill in the art with the benefit of this disclosure. In some embodiments, the communication device 110 includes software (e.g., application) and/or hardware to perform the various payment transactions and capture user voice data as further described below.

The access device 120 is configured to be in electronic communication with the acquirer 130 via a merchant 125. In one embodiment, the access device 120 is a point-of-service (POS) device. Alternatively, the access device 120 can be any suitable device configured to process payment transactions such as credit card or debit card transactions, or electronic settlement transactions, and may have optical, electrical, or magnetic readers for reading data from portable electronic communication devices such as smart cards, keychain device, cell phones, payment cards, security cards, access cards, and the like. In some embodiments, the access device 120 is located at and controlled by a merchant. For example, the access device 120 can be a POS device at a grocery store checkout line. In other embodiments, the terminal could be a client computer or a mobile phone in the event that the user is conducting a remote transaction.

The acquirer 130 (e.g., acquirer bank) includes an acquirer computer (not shown). The acquirer computer can be configured to transfer data (e.g., bank identification number (BIN), etc.) and financial information to the payment processing network 140. In some embodiments, the acquirer 130 does not need to be present in the system 100 for the communication device 110 to transfer the financial and user data to the payment processing network 140. In one non-limiting example, the acquiring bank 130 can additionally check the credentials of the user against a watch list in order to prevent fraud and money laundering schemes, as would be appreciated by one of ordinary skill in the art.

In one embodiment, the payment processing network 140 is VisaNet™, where Visa internal processing (VIP) performs the various payment processing network 140 or multi-lateral switch functions described herein. The payment processing network 140 can include an authorization and settlement server (not shown). The authorization and settlement server ("authorization server") performs payment authorization functions. The authorization server is further configured to send and receive authorization data to the issuer 150. Furthermore, the payment processing network 140 can receive a voice sample by the user (e.g., from the payment device 110, access device 120, or acquirer 130) to determine a risk factor associated with a transaction, as further described below.

In some embodiments, the issuer 150 is a business entity which issues a card to a card holder. Typically, an issuer is a financial institution. The issuer 150 is configured to receive the authorization data from the payment processing network 140 (e.g., the authorization server). The issuer 150 receives authentication data from the authorization server and determines if the user is authorized to perform a given financial transaction (e.g., cash deposit/withdrawal, money transfer, balance inquiry) based on whether the user was authenticated by an identification system.

In some embodiments, the communication device 110 may be connected to and communicate with the payment processing network 140 via an interconnected network 160. One example of an interconnected network 160 is the Internet. The payment processing network 140 may inform the communication device 110 when a payment has been successfully processed. In some embodiments, the payment processing network 140 may be connected to and communicate with the access device 120 via the interconnected network 160. The payment processing network 140 may inform the access device 120 when a payment has been successfully processed which in turn the access device 120 may complete the transaction with the communication device 110.

A server computer 300 is also shown in FIG. 1, and is in operative communication with the interconnected network 160. Details regarding the server computer 300 are provided below.

The interconnected network 160 may comprise one or more of a local area network, a wide area network, a metropolitan area network (MAN), an intranet, the Internet, a Public Land Mobile Network (PLMN), a telephone network, such as the Public Switched Telephone Network (PSTN) or a cellular telephone network (e.g., wireless Global System for Mobile Communications (GSM), wireless Code Division Multiple Access (CDMA), etc.), a VoIP network with mobile and/or fixed locations, a wireline network, or a combination of networks.

In a typical payment transaction in embodiments of the invention, a user may interact with the access device 120 (e.g., with a payment device such as a payment card, or by entering payment information) to conduct a transaction with the merchant 125. The merchant 125 may be operate a merchant computer, which may route an authorization request message to the acquirer 130, and eventually to the issuer 150 via the payment processing network 140.

The issuer 140 will then determine if the transaction is authorized (e.g., by checking for fraud and/or sufficient funds or credit). The issuer will then transmit an authorization response message to the access device 120 via the payment processing network 140 and the acquirer 130.

At the end of the day, the transaction is cleared and settled between the acquirer 130 and the issuer 150 by the payment processing network 140.

The description below provides descriptions of other components in the system as well as authentication methods using voice samples. The authentication methods can be performed at any suitable point during the above-described transaction flow. For example, the voice authentication method may be performed before or after the user uses a payment device to interact with the access device 120. If it is afterwards, then the authentication method may be performed when the authorization request message is received by the payment processing network 140 or the issuer 150.

Figure 2:
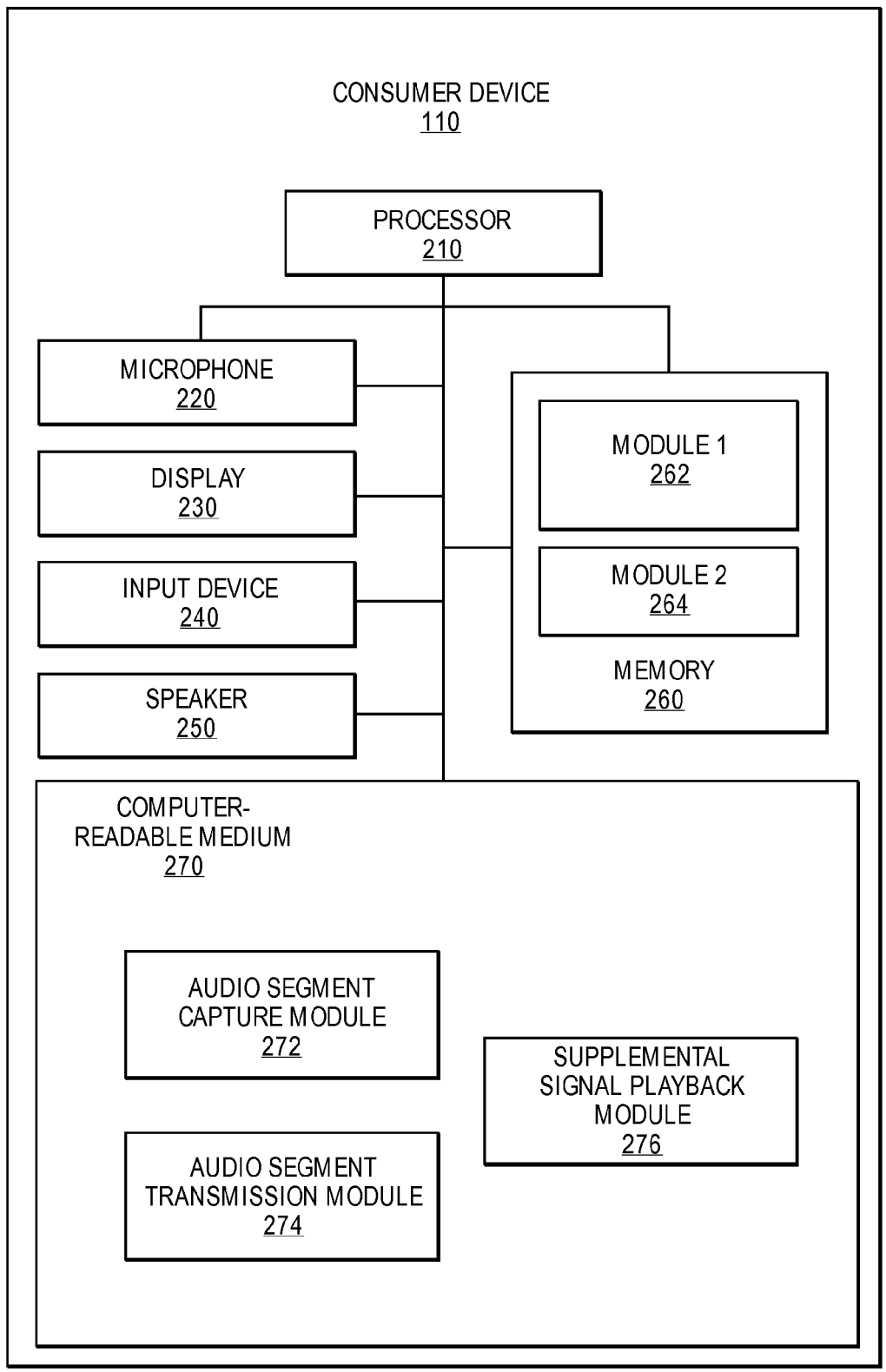
FIG. 2 is a block diagram of a communication device, according to an embodiment of the present invention.

FIG. 2 is a block diagram of a communication device 110, according to an embodiment of the present invention. Communication device 110 includes a processor 210, a microphone 220, a display 230, an input device 240, a speaker 250, a memory 260, and a computer-readable medium 270.

Processor 210 may be any general-purpose processor operable to carry out instructions on the communication device 110. The processor 210 is coupled to other units of the communication device 110 including display 230, input device 240, speaker 250, memory 260, and computer-readable medium 270.

Microphone 220 may be any device that converts sound to an electric signal. In some embodiments, microphone 220 may be used to capture voice data from a user.

Display 230 may be any device that displays information to a user. Examples may include an LCD screen, CRT monitor, or seven-segment display.

Input device 240 may be any device that accepts input from a user. Examples may include a keyboard, keypad, or mouse. In some embodiments, microphone 220 may be considered an input device 240.

Speaker 250 may be any device that outputs sound to a user. Examples may include a built-in speaker or any other device that produces sound in response to an electrical audio signal. In some embodiments, speaker 250 may be used to output a supplemental signal to the user during audio authentication.

Memory 260 may be any magnetic, electronic, or optical memory. Memory 260 includes two memory modules, module 1 262 and module 2 264. It can be appreciated that memory 260 may include any number of memory modules. An example of memory 260 may be dynamic random access memory (DRAM).

Computer-readable medium 270 may be any magnetic, electronic, optical, or other computer-readable storage medium. Computer-readable storage medium 270 includes audio segment capture module 272, and audio segment transmission module 274. Computer-readable storage medium 270 may comprise any combination of volatile and/or non-volatile memory such as, for example, buffer memory, RAM, DRAM, ROM, flash, or any other suitable memory device, alone or in combination with other data storage devices.

Audio segment capture module 272 is configured to capture one or more audio segments, via microphone 220, by a user for voice authentication purposes. In some embodiments, audio segment capture module 272 may capture voice data by the user for purposes of initially registering a user, for subsequent voice authentication, for the first time. In some embodiments, audio segment capture module 272 may capture voice data, via microphone 220, for purposes of authenticating a user in order to complete a transaction. For example, communication device 110 may request a user to register or authenticate his/her voice data by displaying a prompt, on display 230, to repeat (by speaking into microphone 220) a specific word string. During subsequent voice authentication, the audio segment capture module 272 may capture the user's attempt to speak a predetermined word string provided to the user by the communication device 110. In some embodiments, the word string may be provided to the communication device 110 by a server computer. Upon capturing the user's voice data via microphone 220, the audio segment corresponding to the prompted word string may be transmitted to a server computer via audio segment transmission module 274 for purposes of storing the audio segment for subsequent user authentication, described below. In some embodiments the audio segment may also include a supplemental signal, described below.

Audio segment transmission module 274 is configured to transmit captured audio segments to a server computer. In some embodiments, the captured audio segments may be voice data captured during user registration and/or authentication by audio segment capture module 272, described above. In some embodiments, the captured audio segment may be voice data captured during subsequent authentication using voice data by the user, described in further detail below. In yet other embodiments, the captured audio segment may include the voice data by the user and a supplemental signal, as descried below.

Supplemental signal playback module 276 is configured to play a supplemental signal, via speaker 250, during user voice authentication. In some embodiments, the supplemental signal may be an inaudible sound or an audible sound. The supplemental signal may be generated by a server computer and received by the communication device 110 over an input/output interface. In other embodiments, the supplemental signal may be generated locally on the communication device 110. The supplemental signal playback module 276 may play the supplemental signal, via speaker 250, while the user attempts to reproduce the word string. As a result, the audio segment capture module 272 may capture, via microphone 220, the supplemental signal simultaneously with the user's voice data. The user's voice data and the supplemental signal may be collectively referred to as the audio segment. While in other embodiments, the term audio segment may relate only to the user's voice data.

Figure 3:
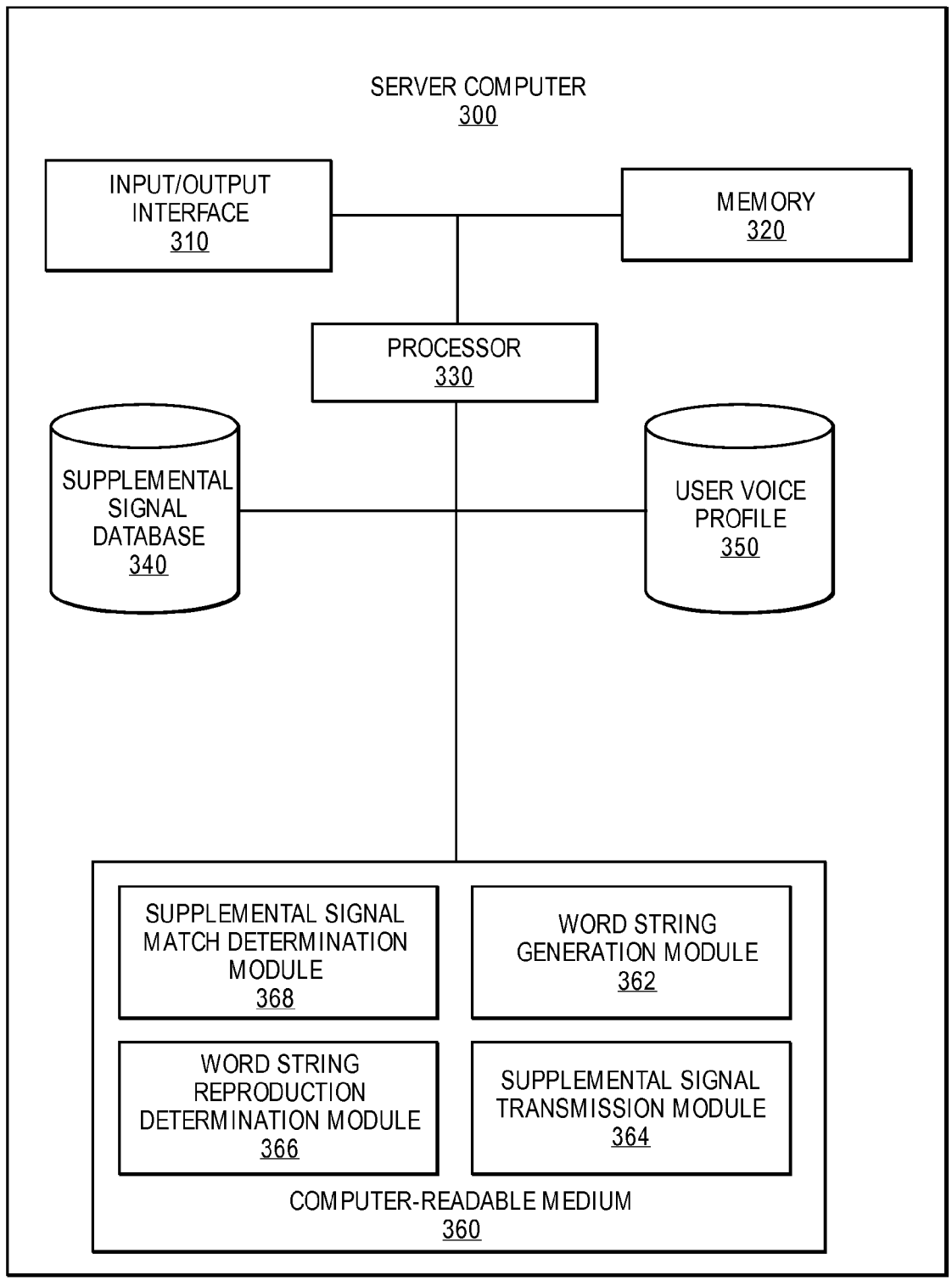
FIG. 3 is a block diagram of a server computer, according to an embodiment of the present invention.

FIG. 3 is a block diagram of a server computer 300, according to an embodiment of the present invention. Server computer 300 includes an input/output interface 310, a memory 320, a processor 330, a supplemental signal database 340, a user voice profile database 350, and a computer-readable medium 360. In some embodiments, the server computer may reside within the interconnected network 160.

The input/output (I/O) interface 310 is configured to receive and transmit data. For example, the I/O interface 310 may receive the audio segment from the communication device 110 (FIG. 1), via the audio segment transmission module 274 (FIG. 1). Upon processing and verifying the authenticity of the audio segment, the I/O interface 310 may indicate to the access device 120 (FIG. 1) and/or communication device 110 (FIG. 1) that a payment transaction may proceed. The I/O interface 310 may also be used for direct interaction with the server computer. The I/O interface 310 may accept input from an input device such as, but not limited to, a keyboard, keypad, or mouse. Further, the I/O interface may display output on a display device.

Memory 320 may be any magnetic, electronic, or optical memory. It can be appreciated that memory 320 may include any number of memory modules, that may comprise any suitable volatile or non-volatile memory devices. An example of memory 320 may be dynamic random access memory (DRAM).

Processor 330 may be any general-purpose processor operable to carry out instructions on the server computer 300. The processor 330 is coupled to other units of the server computer 300 including input/output interface 310, memory 320, supplemental signal database 340, user fraud profile data base 350, and computer-readable medium 360.

Supplemental signal database 340 is configured to store a variety of supplemental signals played back by the communication device 110 (FIG. 1) simultaneous to the user performing voice authentication. In some embodiments, the supplemental signals may be inaudible or audible sounds. While FIG. 3 shows the supplemental signal database 340 residing within the server computer 300, in some embodiments, the supplemental signal database 340 may reside external to and be communicatively coupled with the server computer 300. The supplemental signals stored in the supplemental signal database 340 may be digitally stored. For example, the supplemental signals may be stored in a digital binary format within the supplemental signal database 340. The supplemental signal database 340 may be updated to add, change, or remove any supplemental signals stored. These attributes of the supplemental signal database are described in detail in FIG. 8.

The user voice profile database 350 is configured to store a voice profile of a payment user. The voice profile of a payment user may include attributes such as, but not limited to, initiation time of the payment transaction, the payment cardholder's name, the voice data associated with the payment transaction, the outcome of payment cardholder verification/authentication, and a match score for the audio data. Each time the payment user performs voice authentication via the communication device 1110 (FIG. 1), the user voice profile database 350 may be updated based on the audio segment received by the server computer 300 and details of the payment transaction. Additionally, the user voice profile database 350 may store user voice profiles for a plurality of payment users.

Computer-readable medium 360 may be any magnetic, electronic, optical, or other computer-readable storage medium. Computer-readable storage medium 360 includes word string generation module 362, supplemental signal transmission module 364, word string reproduction determination module 366, and supplemental signal match determination module 368. Computer-readable storage medium 360 may comprise any combination of volatile and/or non-volatile memory such as, for example, buffer memory, RAM, DRAM, ROM, flash, or any other suitable memory device, alone or in combination with other data storage devices.

Word string generation module 362 is configured to generate a word string intended to be spoken by the user for registration and/or authentication purposes. Word string generation module 362 may generate the random word string and transmit it to communication device 110 (FIG. 1) via I/O interface 310 so that communication device 110 (FIG. 1) may display the randomly generated word string to the user via display 230 (FIG. 1). Word string generation module 362 may generate word strings from a set of possible word strings large enough such that it may be highly unlikely that an individual user may be prompted more than once for the same set of words or word strings. In some embodiments, the random word strings generated by word string generation module 362 may be relatively short in length. In some embodiments, the word string generation module 362 may generate a single random word in combination with a fixed word string.

Supplemental signal transmission module 364 is configured to transmit a supplemental signal from the supplemental signal database 340 to the communication device 110 (FIG. 1) via the input/output interface 310. As described above, the supplemental signal database 340 stores the supplemental signals to be played back by the communication device 110 (FIG. 1) simultaneous to the user performing voice authentication. In some embodiments, the supplemental signal transmission module 364 may alter and/or manipulate the supplemental signal prior to transmitting the supplemental signal to the communication device 110 (FIG. 1). For example, the supplemental signal transmission module may change a frequency, pitch, speed, etc. of the supplemental signal prior to transmission.

Word string reproduction determination module 366 is configured to determine whether the captured audio data from the user is an accurate reproduction of the word string generated by word string generation module 362. In some embodiments, word string reproduction determination module 368 may include speech recognition technology operable for determining whether the captured audio data matches the words/prompts that were prompted for/generated by word string generation module 362.

Supplemental signal match determination module 368 is configured to calculate a match score associated with the supplemental signal received by the server computer 300, as part of the audio segment. As described above, the communication device 100 may play back a supplemental signal while the user is performing voice authentication. As the user performs the voice authentication by speaking a reproduction of a prompted word string, the supplemental signal being played back by the communication device 110 (FIG. 1) is recorded via the microphone 220 (FIG. 2) along with the user's voice reproduction of the word string, collectively known as the audio segment. The audio segment may then be sent by the communication device 110 (FIG. 1) to the server computer 300. The supplemental signal match determination module 368 may determine whether the received supplemental signal within the received audio segment matches the supplemental signal initially sent to the communication device 110 (FIG. 1) by the server computer 300. The determination may be based on a match score (typically between 0 and 100), where the score expresses a degree of confidence that the received supplemental signal matches with the initially sent supplemental signal and ultimately that the user attempting to authenticate is the genuine user and not a fraudster attempting a replay attack. This score can be passed on to other parts of a risk scoring mechanism, such that the score, along with other risk parameters, contributes to the overall decision of approving or declining the transaction.

It can be appreciated that in some embodiments the server computer 300 may reside within the payment processing network 140 (FIG. 1).

Figure 4:
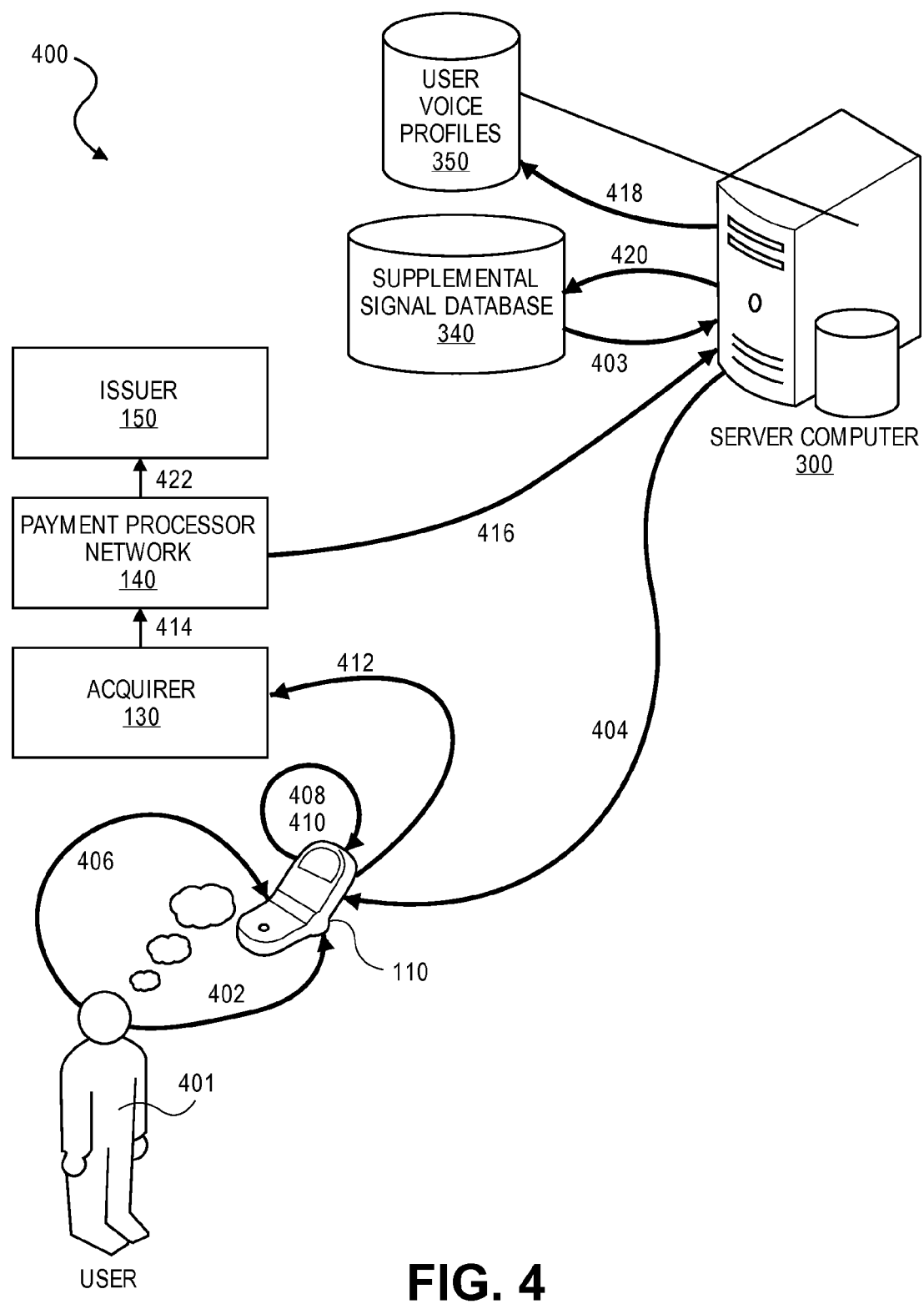
FIG. 4 is a flow diagram illustrating a method for authenticating a user for a transaction via a communication device, according to an embodiment of the present invention.

FIG. 4 is a flow diagram illustrating a method for authenticating a user 401 for a transaction via a communication device 110, according to an embodiment of the present invention. The voice authentication system 400 includes a communication device 110 (e.g., mobile phone), acquirer 130, payment processing network 140, issuer 150, and a server computer 300. It can be appreciated that while the server computer 300 is shown external to the payment processing network 140, in some embodiments the server computer 300 may reside within the payment processing network 140. The voice authentication system 400 provides a mechanism to authenticate a user 401 using voice authentication techniques, specifically by playing back and recording a supplemental signal substantially simultaneous to the user performing voice authentication.

The user 401 may use his/her communication device 110 to initiate a financial transaction. In one embodiment, the user may activate an application on the communication device 110 or dial a specific number in order to initiate the financial transaction. In other embodiments, the user may use the communication device 110 that is equipped with near-field communication technology (NFC) to initiate a financial transaction at an access device 120 (FIG. 1). The access device 120 (FIG. 1) may be located at a merchant site and the user may communicatively couple the communication device 110 to the access device 120 (FIG. 1) to initiate the financial transaction. In one embodiment, the financial transaction may be initiated in order to pay for an item or service, from the merchant, purchased by the user 401. Once the financial transaction is initiated, the user may be asked to provide a voice sample by speaking a certain word or phrase into the microphone of communication device 110 (step 402). For example, the voice authentication system 400 may prompt the user 401, via display 230 (FIG. 2) of communication device 110, to speak a random word string, such as "The quick brown fox jumps over the lazy dog", or the user 401 may navigate the application using voice which may be captured and used. In some embodiments of the invention, the prompted word string is less than about 7 words in length, and preferably five or less words in length. By keeping the lengths of the prompts short, users are less frustrated and are more likely to use the systems and methods according to embodiments of the invention.

In another example, the voice authentication system 400 may prompt the user 401 with a prompt having a variable or random element. In some embodiments, the prompt may have both a random element and a fixed element, with the fixed element being greater than the random element. In some embodiments, the fixed element can have a length of 7, 5, 3, or 2 words or less, while the random element may have a length of 5, 3, or 2 words or less. For example, embodiments of the invention may provide a first word string prompt such as "Please repeat the word TREE LEAVES" and subsequently a second prompt such as "Please repeat the words CAT AND DOG". The phrase "Please repeat the words" may be a fixed portion of the prompt, while words "TREE LEAVES" and "CAT AND DOG" may be random or variable portions of the prompt.

In some embodiments, the request to the user 401 to speak the prompt may be displayed on the communication device 110. The voice authentication system 400 is described in further detail below.

Prior to the user 401 actually speaking the prompted word string, the communication device 110 may receive a supplemental signal from the server computer 300 (step 404). In some embodiments, the supplemental signal may include an audible or inaudible sound. As described above, the supplemental signal may be retrieved from the supplemental signal database 340 and transmitted to the communication device 100 via the supplemental signal transmission module 364 (FIG. 3) (step 403). In some embodiments, the supplemental signal transmission module 364 (FIG. 3) may alter and/or manipulate the supplemental signal prior to transmitting the supplemental signal to the communication device 110. For example, the supplemental signal transmission module 364 (FIG. 3) may change a frequency, pitch, speed, etc. of the supplemental signal prior to transmission. It can be appreciated that the supplemental signal transmitted by the communication device 110 may be unique to the particular transaction. Further, by altering and/or manipulating the supplemental signal prior to transmitting, it may be ensured that the same supplemental signal is never used for more than one transaction.

The user may then speak the prompted word string into the microphone of the communication device 110 (step 406). For example, the user may speak "The quick brown fox jumps over the lazy dog", similar to the example of the prompted word string provided above. Concurrent or substantially simultaneous to the user 401 speaking the prompted word string, the communication device 110 can emit the supplemental signal from the speaker of communication device 110 (step 408). For example, the communication device 110 may emit an inaudible sound that cannot be heard by a human, such as sound having frequency of less the 20 Hz or more than 20,000 Hz. The microphone of the communication device 110 can concurrently or substantially simultaneous capture this inaudible sound along with the spoken prompted word string by the user 401 (step 410). That is, while the speaker 250 (FIG. 2) of the communication device 110 is playing the supplemental signal (e.g., the inaudible sound), the microphone 220 (FIG. 2) of the communication device 110 may concurrently or substantially simultaneous capture both the supplemental signal and the speaker's attempt to reproduce to the prompted word string.

The communication device 110 may send the captured user voice data and supplemental signal (collectively referred to as the audio segment) along with any transaction information to an acquirer 130 (step 412). In some embodiments, the communication device 110 may send the audio segment and transaction information to the acquirer 130 via an access device (not shown). Acquirer 130 may then forward the audio segment and transaction information to the payment processing network 140 (step 414). In some embodiments, the audio segment received by payment processing network 140 from communication device 110 may be included in the payment authorization request message described herein.

The payment processing network 140 may then authenticate the user 401 based on the received audio segment. The payment processing network 140 may establish a communication with the server computer 300 in order to authenticate the user 401 (step 416). In some embodiments, the server computer 300 may reside within the payment processing network 140. In a particular embodiment, the payment processing network 140 may consult with the server computer 300 using the received audio segment (including the user voice data and the supplemental signal). The server computer 300 may determine whether the supplemental signal initially sent by the server computer 300 to the communication device 110 (in step 404) matches the supplemental signal received from the payment processing network 140 (step 420). Additionally, the server computer 300 may determine whether the user voice data received in the audio segment matches a voice profile of the user 401 stored in the user voice profile database 350 (step 418). The server computer 300 may parse and analyze the user voice data in order to make this determination. If the server computer 300 determines a match of the user voice data, the user voice data may be stored in the user voice profiles database 350 and it may be updated with the currently received user voice data and used for future evaluation of voice data from the user 401.

In some embodiments, the server computer 300 provides a pass/fail score that can be used as what is known as a "Cardholder Verification Mechanism" (CVM) in certain standards, alongside other CVMs such as a Personal Identification Number (PIN) or signature. In this mode, an access device (e.g., at merchant) or the communication device 110 will be informed as to whether voice authentication has passed or failed, and can make a decision whether to proceed with the transaction. The determination of the pass/fail score may be made by the server computer 300 upon receiving the voice data and supplemental signal in the audio segment. In some embodiments, the pass/fail response may be based on whether the user 401 voice data is consistent with previous user voice data stored in the user voice profile database 350 and whether the supplemental signal received in the audio segment matches the supplemental signal originally sent by the server computer 300 to the communication device 110. If the above conditions are true, the response may indicate that authentication has passed.

In some embodiments, the server computer 300 provides a score (typically between 0 and 100), where the score expresses a degree of confidence that a user 401 is the genuine user. This score can be passed on to other parts of a risk scoring mechanism (one run by payment processor, by the issuer, or by a third party), such that the score, along with other risk parameters, contributes to the overall decision of approving or declining the transaction. In some embodiments, the match score is based on how closely the captured user voice data matches to previously captured user voice data stored in the user voice profile database 350. That is, how closely the current voice data matches to previously obtained voice data from the user. This may be determined by analyzing features of the voice sample such as, but not limited to, tone, pitch, etc. Additionally, the score may also express a degree of confidence that the supplemental signal received in the audio segment matches the supplemental signal originally sent by the server computer 300 to the communication device 110.

In another embodiment, communication device 110 may have a repository of supplemental signals stored in its memory. When communication device 110 is registered with the payment processing network 140 and/or issuer 150, it may be provided with numerous supplemental signals that can be stored by communication device 110. These supplemental signals can be associated with the user 401 account. In this instance, when the user 401 speaks the prompted word string, communication device 110 can select one of the stored supplemental signals and output it via its speaker 250 (FIG. 2) to be captured by the microphone 220 (FIG. 2) along with the user's 401 spoken word or phrase. In this instance, the voice authentication can occur by comparing the captured supplemental signal with the supplemental signal pre-associated with the user account and checking whether the captured supplemental signal matches one of the supplemental signals associated with the user account.

Once the payment processing network 140 authenticates the user based on the received audio segment and other financial information, it can communicate with issuer 150 to complete the transaction (step 422).

In another embodiment, communication device 110 may directly communicate with server computer 300 to provide both the user voice data and the supplemental signal. In this instance, server computer 300 may work in conjunction with payment processing network 140 to authenticate the user using one or more of the techniques described above. Thus, in this instance, the voice/sound based authentication can occur independently of the standard authentication process that is currently in use or any other type of authentication, e.g., communication device ID based authentication.

The supplemental signal can be transmitted to and from the communication device 110 in various ways. In one embodiment, the server computer 300 can transmit the supplemental signal as an audio signal to communication device 110 and the communication device 110 can receive the supplemental signal via its audio channel. The communication device 110 can output the supplemental signal, via its speaker, and the microphone can capture the supplemental signal. The communication device 110 can then digitize the supplemental signal and transmit that over another channel (e.g., data channel) to the server computer 300. In another embodiment, payment processing network 140 can transmit the supplemental signal in a digital format to the communication device 110 and the communication device can convert and output the supplemental signal in an analog format. The microphone of the communication device 110 can capture the analog supplemental signal, convert it back to a digital format, and send it to the payment processing network 140 via an access device (not shown) along with the user's voice data. The payment processing network 140 can then compare the digital version of the supplemental signal that it sent to the communication device 110 with the digital version of the supplemental signal received from the communication device 110 to perform the authentication, as described above.

In some embodiments, the server computer 300 may be part of issuer 150 and the comparison and authentication can be performed by issuer 150.

Accordingly, the voice authentication system 400 provides an added layer of assurance that can be selectively drawn upon, e.g. for transactions that are deemed risky and which may otherwise have a high likelihood of declines ("Step-up authentication"). The added layer of assurance derives from the supplemental signal playing concurrently or substantially simultaneous to capturing the user voice data. Since the supplemental signal is unique for each transaction, the likelihood of a fraudster capturing the supplemental signal and using it in a replay attack to fraudulently authenticate is drastically reduced. In particular such an option may be attractive if the communication device 110 is used to initiate the transaction, since in this case the communication device 110 may not play the role of a secondary channel or device if it is already the payment instrument for that transaction. In instances where the supplemental signal is an inaudible sound, the fraudster may not even be aware of the supplemental signal that is concurrently played with capturing the user voice data by the communication device 110.

Since the supplemental signal is unique to each payment transaction, in some embodiments, the supplemental signal may be used as token for the user's 401 primary account number (PAN). That is, the supplemental signal may serve as a unique token for the particular transaction and the token may be used in the standard payment authorization process.

In some embodiments, the payment processing network 140, a payment processor, or a third party may provide a channel (not shown in FIG. 1) through which to prompt the user 401 during a payment transaction. The prompt may be displayed on the communication device 110 and may request that the user 401 to speak certain words or prompts. As described above, the recording of the user 401 speaking those words or prompts may then be transmitted to the server computer 300, which may perform the voice authentication.

The channel through which the user 401 is prompted may utilize an application on his/her communication device 110 (e.g., mobile phone), an Internet session using a browser or app on their phone or PC, or some other mechanism that allows the prompted words or prompts to be displayed or played and allows the user's 401 voice to be recorded (via a microphone on communication device 110) and transmitted to the server computer 300 (via the payment processing network 140). In some embodiments, the prompts may be displayed visually on communication device 110. In some embodiments, the prompts may be played audibly on communication device 110.

Figure 5:
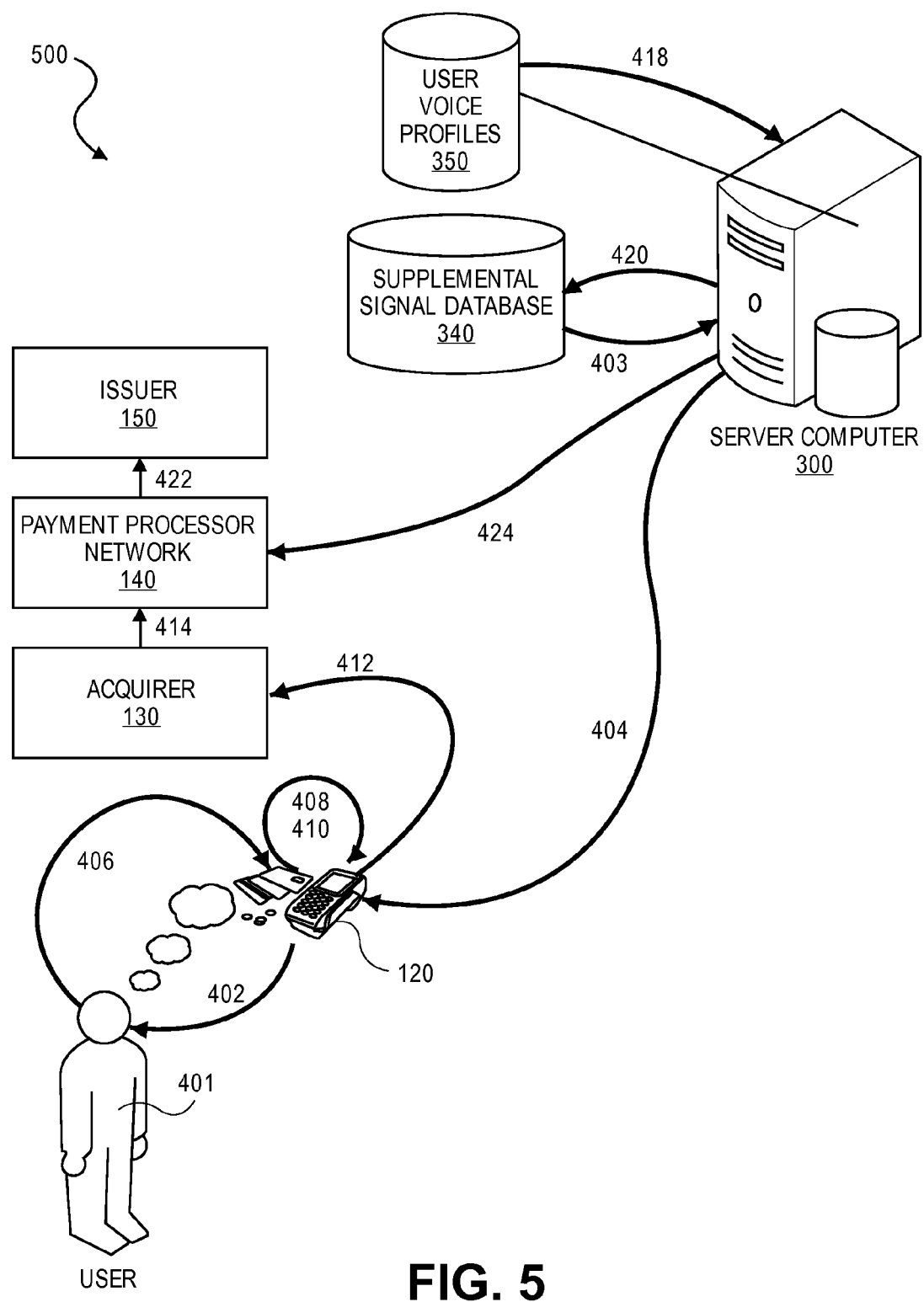
FIG. 5 is a flow diagram illustrating a method for authenticating a user 401 for a transaction via an access device 120, according to an embodiment of the present invention.

FIG. 5 is a flow diagram illustrating a method for authenticating a user 401 for a transaction via an access device 120, according to an embodiment of the present invention. FIG. 5 is similar to FIG. 4 except that the voice authentication system 500 includes an access device 120 in place of the communication device 110 (FIG. 4).

The voice authentication system 500 includes an access device 120 (e.g., POS terminal), acquirer 130, payment processing network 140, issuer 150, and a server computer 300. It can be appreciated that while the server computer 300 is shown external to the payment processing network 140, in some embodiments the server computer 300 may reside within the payment processing network 140. The voice authentication system 500 provides a mechanism to authenticate a user 401 using voice authentication techniques, specifically by playing back and recording a supplemental signal substantially simultaneous to the user performing voice authentication.

The user 401 may use the access device 120 (e.g., a POS terminal at a merchant site) to initiate a financial transaction. In some embodiments, the user may use a communication device that is equipped with near-field communication technology (NFC) to interact with the access device 120 and initiate the financial transaction. The access device 120 (FIG. 1) may be located at a merchant site and the user may communicatively couple the communication device to the access device 120 (FIG. 1) to initiate the financial transaction. In other embodiments, the user may swipe his/her payment card at the access device 120 to initiate the transaction. In one embodiment, the financial transaction may be initiated in order to pay for an item or service, from the merchant, purchased by the user 401. Once the financial transaction is initiated, the user may be asked to provide a voice sample by speaking a certain word or phrase into the microphone of the access device 120 (step 402). For example, the voice authentication system 500 may prompt the user 401, via a display on the access device 120, to speak a random word string, such as "The quick brown fox jumps over the lazy dog". In some embodiments of the invention, the prompted word string is less than about 7 words in length, and preferably five or less words in length. By keeping the lengths of the prompts short, users are less frustrated and are more likely to use the systems and methods according to embodiments of the invention.

In another example, the voice authentication system 500 may prompt the user 401 with a prompt having a variable or random element. In some embodiments, the prompt may have both a random element and a fixed element, with the fixed element being greater than the random element. In some embodiments, the fixed element can have a length of 7, 5, 3, or 2 words or less, while the random element may have a length of 5, 3, or 2 words or less. For example, embodiments of the invention may provide a first word string prompt such as "Please repeat the word TREE LEAVES" and subsequently a second prompt such as "Please repeat the words CAT AND DOG". The phrase "Please repeat the words" may be a fixed portion of the prompt, while words "TREE LEAVES" and "CAT AND DOG" may be random or variable portions of the prompt.

In some embodiments, the request to the user 401 to speak the prompt may be displayed on the access device 120. The voice authentication system 500 is described in further detail below.

Prior to the user 401 actually speaking the prompted word string, the access device 120 may receive a supplemental signal from the server computer 300 (step 404). In some embodiments, the supplemental signal may include an audible or inaudible sound. As described above, the supplemental signal may be retrieved from the supplemental signal database 340 and transmitted to the access device 120 via the supplemental signal transmission module 364 (FIG. 3) (step 403). In some embodiments, the supplemental signal transmission module 364 (FIG. 3) may alter and/or manipulate the supplemental signal prior to transmitting the supplemental signal to the access device 120. For example, the supplemental signal transmission module 364 (FIG. 3) may change a frequency, pitch, speed, etc. of the supplemental signal prior to transmission. It can be appreciated that the supplemental signal transmitted by the access device 120 may be unique to the particular transaction. Further, by altering and/or manipulating the supplemental signal prior to transmitting, it may be ensured that the same supplemental signal is never used for more than one transaction.

The user may then speak the prompted word string into the microphone of the access device 120 (step 406). For example, the user may speak "The quick brown fox jumps over the lazy dog", similar to the example of the prompted word string provided above. Concurrent or substantially simultaneous to the user 401 speaking the prompted word string, the access device 120 can emit the supplemental signal from the speaker of the access device 120 (step 408). For example, the access device 120 may emit an inaudible sound that cannot be heard by a human, such as sound having frequency of less the 20 Hz or more than 20,000 Hz. The microphone of the access device 120 can concurrently or substantially simultaneous capture this inaudible sound along with the spoken prompted word string by the user 401 (step 410). That is, while the speaker of the access device 120 is playing the supplemental signal (e.g., the inaudible sound), the microphone of the access device 120 may concurrently or substantially simultaneous capture both the supplemental signal and the speaker's attempt to reproduce to the prompted word string.

The access device 120 may send the captured user voice data and supplemental signal (collectively referred to as the audio segment) along with any transaction information to an acquirer 130 (step 412). Acquirer 130 may then forward the audio segment and transaction information to the payment processing network 140 (step 414). In some embodiments, the audio segment received by payment processing network 140 from access device 120 may be included in the payment authorization request message described herein.

The payment processing network 140 may then authenticate the user 401 based on the received audio segment. The payment processing network 140 may establish a communication with the server computer 300 in order to authenticate the user 401 (step 416). In some embodiments, the server computer 300 may reside within the payment processing network 140. In a particular embodiment, the payment processing network 140 may consult with the server computer 300 using the received audio segment (including the user voice data and the supplemental signal). The server computer 300 may determine whether the supplemental signal initially sent by the server computer 300 to the access device 120 (in step 404) matches the supplemental signal received from the payment processing network 140 (step 420). Additionally, the server computer 300 may determine whether the user voice data received in the audio segment matches a voice profile of the user 401 stored in the user voice profile database 350 (step 418). The server computer 300 may parse and analyze the user voice data in order to make this determination. If the server computer 300 determines a match of the user voice data, the user voice data may be stored in the user voice profiles database 350 and it may be updated with the currently received user voice data and used for future evaluation of voice data from the user 401.

In some embodiments, the server computer 300 provides a pass/fail score that can be used as what is known as a "Cardholder Verification Mechanism" (CVM) in certain standards, alongside other CVMs such as a Personal Identification Number (PIN) or signature. In this mode, the access device 120 (e.g., at merchant) will be informed as to whether voice authentication has passed or failed, and can make a decision whether to proceed with the transaction. The determination of the pass/fail score may be made by the server computer 300 upon receiving the voice data and supplemental signal in the audio segment. In some embodiments, the pass/fail response may be based on whether the user 401 voice data is consistent with previous user voice data stored in the user voice profile database 350 and whether the supplemental signal received in the audio segment matches the supplemental signal originally sent by the server computer 300 to the access device 120. If the above conditions are true, the response may indicate that authentication has passed.

In some embodiments, the server computer 300 provides a score (typically between 0 and 100), where the score expresses a degree of confidence that a user 401 is the genuine user. This score can be passed on to other parts of a risk scoring mechanism (one run by payment processor, by the issuer, or by a third party), such that the score, along with other risk parameters, contributes to the overall decision of approving or declining the transaction. In some embodiments, the match score is based on how closely the captured user voice data matches to previously captured user voice data stored in the user voice profile database 350. That is, how closely the current voice data matches to previously obtained voice data from the user. This may be determined by analyzing features of the voice sample such as, but not limited to, tone, pitch, etc. Additionally, the score may also express a degree of confidence that the supplemental signal received in the audio segment matches the supplemental signal originally sent by the server computer 300 to the access device 120.

In another embodiment, access device 120 may have a repository of supplemental signals stored in its memory. When access device 120 is registered with the payment processing network 140 and/or issuer 150, it may be provided with numerous supplemental signals that can be stored by access device 120. These supplemental signals can be associated with the user 401 account. In this instance, when the user 401 speaks the prompted word string, access device 120 can select one of the stored supplemental signals and output it via its speaker 250 (FIG. 2) to be captured by the microphone along with the user's 401 spoken word or phrase. In this instance, the voice authentication can occur by comparing the captured supplemental signal with the supplemental signal pre-associated with the user account and checking whether the captured supplemental signal matches one of the supplemental signals associated with the user account.

Once the payment processing network 140 authenticates the user based on the received audio segment and other financial information, it can communicate with issuer 150 to complete the transaction (step 422). For example, the authorization request message may be reformatted without the audio segment data and transmitted to the issuer 150 for approval. The issuer may respond to the authorization request message with an authorization response message indicating approval or disapproval of the transaction. This authorization response message may be transmitted back to the access device 120 via the payment processing network 140 and the acquirer 130. At the end of the day or at any other suitable time, a settlement and clearing process can occur.

In another embodiment, access device 120 may directly communicate with server computer 300 to provide both the user voice data and the supplemental signal. In this instance, server computer 300 may work in conjunction with payment processing network 140 to authenticate the user using one or more of the techniques described above. Thus, in this instance, the voice/sound based authentication can occur independently of the standard authentication process that is currently in use or any other type of authentication, e.g., access device ID based authentication.

The supplemental signal can be transmitted to and from the access device 120 in various ways. In one embodiment, the server computer 300 can transmit the supplemental signal as an audio signal to access device 120 and the access device 120 can receive the supplemental signal via its audio channel. The access device 120 can output the supplemental signal, via its speaker, and the microphone can capture the supplemental signal. The access device 120 can then digitize the supplemental signal and transmit that over another channel (e.g., data channel) to the server computer 300. In another embodiment, payment processing network 140 can transmit the supplemental signal in a digital format to the access device 120 and the access device can convert and output the supplemental signal in an analog format. The microphone of the access device 120 can capture the analog supplemental signal, convert it back to a digital format, and send it to the payment processing network 140 along with the user's voice data. The payment processing network 140 can then compare the digital version of the supplemental signal that it sent to the access device 120 with the digital version of the supplemental signal received from the access device 120 to perform the authentication, as described above.

In some embodiments, the server computer 300 may be part of issuer 150 and the comparison and authentication can be performed by issuer 150.

Accordingly, the voice authentication system 500 provides an added layer of assurance that can be selectively drawn upon, e.g. for transactions that are deemed risky and which may otherwise have a high likelihood of declines ("Step-up authentication"). The added layer of assurance derives from the supplemental signal playing concurrently or substantially simultaneous to capturing the user voice data. Since the supplemental signal is unique for each transaction, the likelihood of a fraudster capturing the supplemental signal and using it in a replay attack to fraudulently authenticate is drastically reduced. In particular such an option may be attractive if the access device 120 is used to initiate the transaction, since in this case the access device 120 may not play the role of a secondary channel or device if it is already the payment instrument for that transaction. In instances where the supplemental signal is an inaudible sound, the fraudster may not even be aware of the supplemental signal that is concurrently played with capturing the user voice data by the access device 120.

Since the supplemental signal is unique to each payment transaction, in some embodiments, the supplemental signal may be used as token for the user's 401 primary account number (PAN). That is, the supplemental signal may serve as a unique token for the particular transaction and the token may be used in the standard payment authorization process.

In some embodiments, the payment processing network 140, a payment processor, or a third party may provide a channel (not shown in FIG. 1) through which to prompt the user 401 during a payment transaction. The prompt may be displayed on the access device 120 and may request that the user 401 to speak certain words or prompts. As described above, the recording of the user 401 speaking those words or prompts may then be transmitted to the server computer 300, which may perform the voice authentication.

The channel through which the user 401 is prompted may utilize an application on his/her access device 120 (e.g., mobile phone), an Internet session using a browser or app on their phone or PC, or some other mechanism that allows the prompted words or prompts to be displayed or played and allows the user's 401 voice to be recorded (via a microphone on access device 120) and transmitted to the server computer 300 (via the payment processing network 140). In some embodiments, the prompts may be displayed visually on access device 120. In some embodiments, the prompts may be played audibly on access device 120.

Figure 6A:
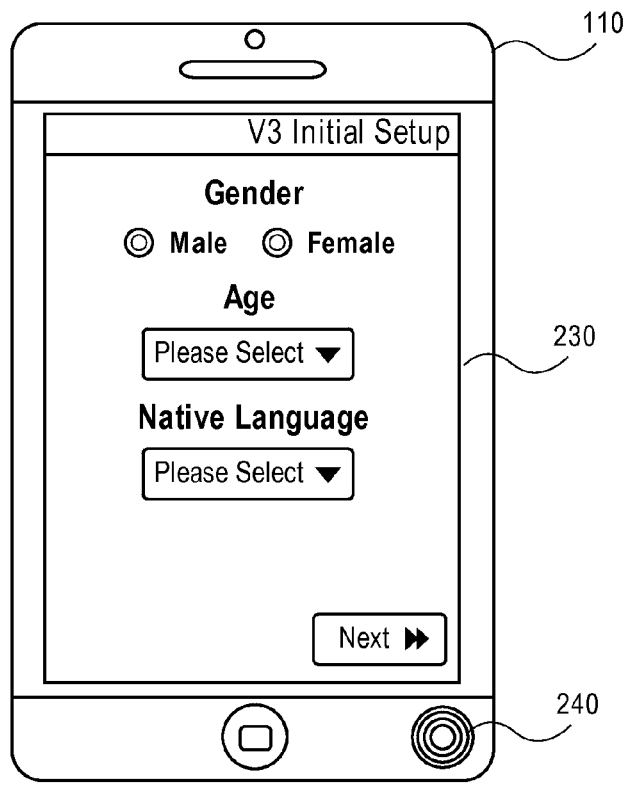
FIG. 6A shows a screenshot of initial voice authentication enrollment on a communication device 110, according to an embodiment of the present invention.

FIG. 6A shows a screenshot of initial voice authentication enrollment on a communication device 110, according to an embodiment of the present invention. The screenshot shows an example of a prompt, presented on the display 230, for user 401 (FIG. 4) enrollment in the voice authentication system 400 (FIG. 4) that may be displayed on the communication device 110 (FIG. 1). FIG. 6A illustrates the first step in initial enrollment with the voice authentication system 400. During enrollment, no match scoring is calculated. Instead, the captured voice data of the user 401 (FIG. 4) may be used to build the user's voice profile eventually stored in the user voice profile database 350 (FIG. 4). These voice recordings may be submitted to the server computer 300 (FIG. 4) as enrollment recordings, and the server computer 300 (FIG. 4) may create a profile for the user 401 (FIG. 4) and store this profile for future reference, the profile being linked to the user 401 (FIG. 4). In some embodiments, the profile may be stored within the user voice profile database 350 (FIG. 4) within the server computer 300 (FIG. 4).

During initial enrollment, the prompt may ask the user for their gender, age, and/or native language. This information about the user 401 (FIG. 4) may be stored in the user voice profile database 350 (FIG. 4) within the server computer 300 (FIG. 4) and used for parsing and analyzing subsequently received user voice data.

Figure 6B:
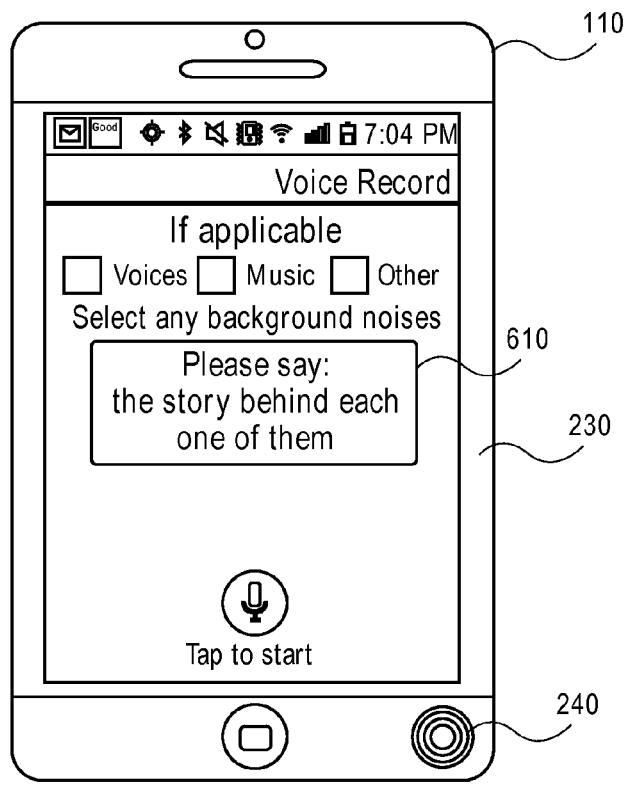
FIG. 6B shows a screenshot of capturing voice data for voice authentication enrollment, according to an embodiment of the present invention.

FIG. 6B shows a screenshot of capturing voice data for voice authentication enrollment, according to an embodiment of the present invention. After the user 401 (FIG. 4) enters his/her user details, as described above, the voice authentication system 400 (FIG. 4) may further request that the user 401 (FIG. 4) speak a specified word string 610. For example, the word string 610 may request that the user 401 (FIG. 4) speak the words, "the story behind each one of them." It can be appreciated that the enrollment word string 610 may be different for each user 401 (FIG. 4) or different for each enrollment word string. It can further be appreciated that the enrollment word string 610 may differ from the voice authentication word string (see below). Further, the user 401 (FIG. 4) may be required to speak multiple word strings prior to completing enrollment with the voice authentication system 400 (FIG. 4).

In some embodiments, the user 401 (FIG. 4) may be able to select whether any type of background noises, such as other individuals speaking, music, etc., exist at the time the user 401 (FIG. 4) is speaking the specific word string 610 for enrollment. The user 401 (FIG. 4) may speak the specific word string 610 and his/her voice may be captured by microphone 240. If the user 401 (FIG. 4) indicated that any background noises were present, the voice authentication system 400 may try to filter out the background noises prior to transmitting the audio segment (including the supplemental signal and user voice data) to the server computer 300 (FIG. 4).

Figure 6C:
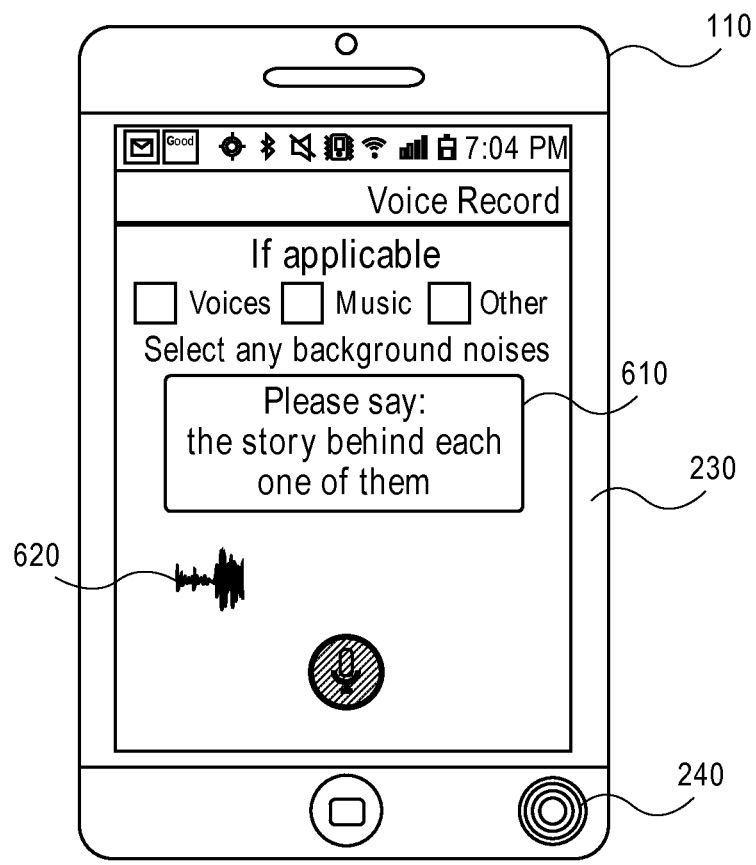
FIG. 6C shows a screenshot of progressive feedback while capturing user voice data for voice authentication enrollment, according to an embodiment of the present invention.

FIG. 6C shows a screenshot of progressive feedback while capturing user voice data for voice authentication enrollment, according to an embodiment of the present invention. As described above, the voice authentication system 400 (FIG. 4) may generate a word string 610 for a user 401 (FIG. 4) to repeat for purposes of enrollment with the system. The word string 610 may be generated by the server computer 300 (FIG. 4). In some embodiments, a progressive feedback indicator 620 may be presented on display 230 of communication device 110. The progressive feedback indicator 620 may indicate to the user 401 (FIG. 4) his/her progress in completing repetition of the word string 610 and may also indicate specifics of the analog voice signal being captured by the microphone 240.

Figure 7A:
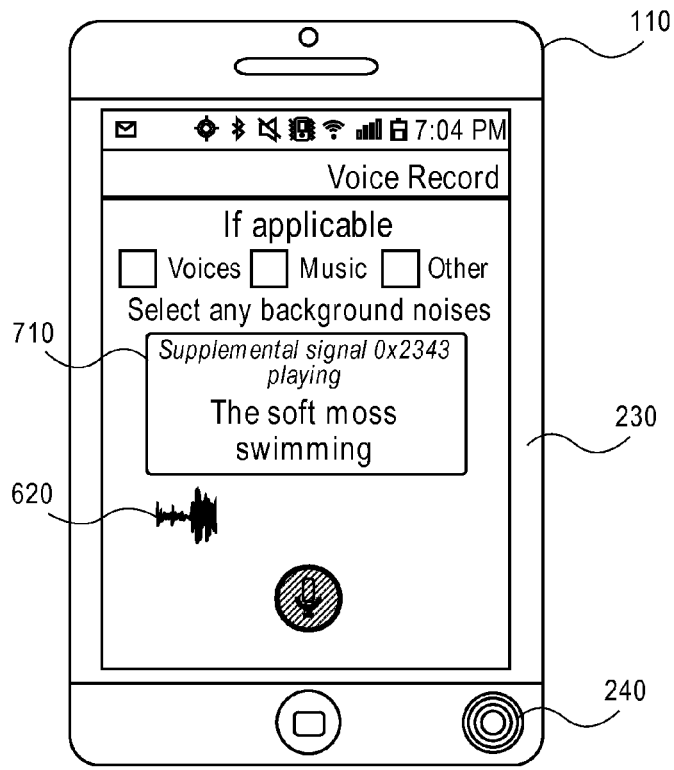
FIG. 7A shows a screenshot of voice authentication on a communication device 110 using a first word string 710, according to an embodiment of the present invention.

FIG. 7A shows a screenshot of voice authentication on a communication device 110 using a first word string 710, according to an embodiment of the present invention. After a sufficient number of successful recordings of word strings for enrollment have been made in order for the user's 401 (FIG. 4) voice profile to be created, subsequent word strings 710 may be used for authentication and each recording of the user 401 (FIG. 4) may be submitted to the server computer 300 (FIG. 4), which may respond with either a match/no match (pass/fail) response or with a match score, as described above.

The prompts for enrollment and for authentication may be quite short in length, in order to make for a positive user 401 (FIG. 4) experience, with each prompt 710 consisting of only a few words. For this reason it is anticipated that the first few recordings may be used for enrollment (building the profile of the user's voice) before any authentication, as shown in FIG. 7A, may take place. The user 401 (FIG. 4) may not have to be made aware of any difference between enrollment and authentication. The user 401 (FIG. 4) may simply be prompted in connection with a payment transaction and may not necessarily have knowledge as to whether the voice recording may have played any role in the approval or decline of the transaction. For example, as illustrated in FIG. 6B, the user 401 (FIG. 4) may be prompted to speak "the story behind each one of them," for enrollment. Similarly, as illustrated in FIG. 7A, the user 401 (FIG. 4) may be prompted to speak "the soft moss swimming," for authentication.

In order to prevent prior recordings from being useful for any subsequent authentication (thus, to prevent replay attacks by a fraudster), a supplemental signal may be played by the communication device 110 concurrent to the voice recording. As shown in FIG. 7A, a notification may be presented to the user that the supplemental signal is playing. This may be beneficial when the supplemental signal is an inaudible sound, as it proves the user with reassurance that the added security measure is in fact functioning. As mentioned above, the supplemental signal may be unique for each voice authentication attempt and each payment transaction.

The communication device 110 may also function as a quality control gate keeper that performs speech recognition to recognize recording quality that is so poor (due to noise, low speaker volume, high speaker volume, etc.) that the user 401 (FIG. 4) may be prompted to try again, move to a quieter environment etc., prior to submitting the recording to the server computer 300 (FIG. 4). This may improve the user 401 (FIG. 4) experience by lowering transaction time for problematic recordings.

The word strings may be designed to enable a convenient user 401 (FIG. 4) experience while providing the best feasible security. The word strings may consist of easy to pronounce words combined in such a way that each word string may include sufficient phonemes for a high reliability matching to take place. For global solutions, the word strings may be provided in several languages and in any language the cardholder wishes.

For voice authentication matching, the quality of the profile of a user's 401 (FIG. 4) voice may improve as more voice data is collected from the user 401 (FIG. 4). For reasons of customer convenience some embodiments keep each captured voice data short, and thus it may require a (small) number of recordings for the profile to reach an acceptable level of quality. It may be possible to subsequently improve the profile by adding more voice data. Since the user 401 (FIG. 4) may be performing authentications using voice recordings, these recordings may be added to the user's 401 (FIG. 4) voice profile, thereby improving it. Often times, however, where new voice data becomes available after an initial enrollment, it is difficult to determine whether the voice data was those of the legitimate user 401 (FIG. 4) or of a fraudster. Therefore, adding voice prints may not be possible without risking to pollute the user's voice profile and actually make it closer to that of the fraudster's voice. In certain embodiments, however, it is possible to play a unique supplemental signal and capture the supplemental signal concurrent to capturing the user voice data, to prevent a fraudster from performing a replay attack. This same technique and concept may be applied to the initial enrollment as well.

In some embodiments, the user 401 (FIG. 4) may be presented with a progressive feedback indicator 520 indicating progress towards capturing the user's voice for authentication.

Figure 7B:
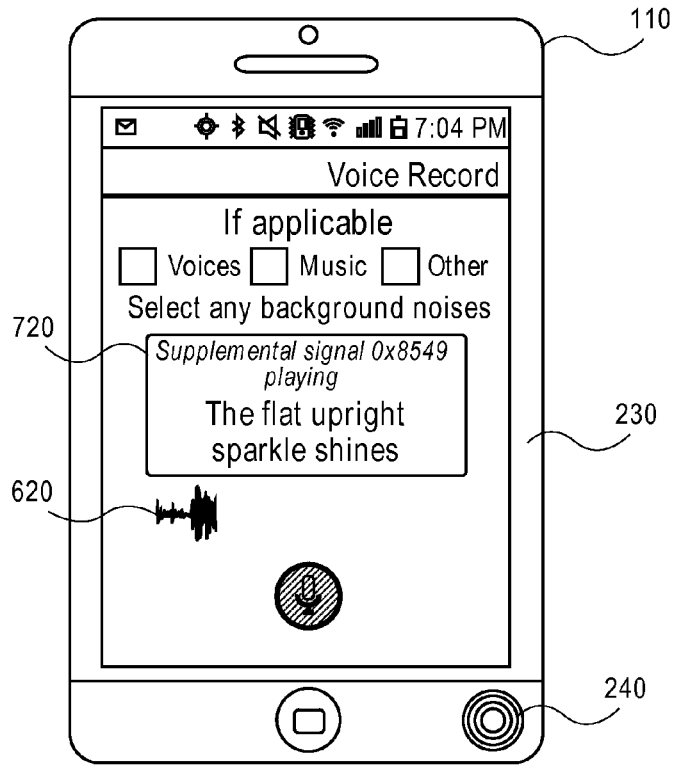
FIG. 7B shows a screenshot of speaker verification on a communication device using a second word string 720, according to an embodiment of the present invention.

FIG. 7B shows a screenshot of speaker verification on a communication device using a second word string 720, according to an embodiment of the present invention. FIG. 7B illustrates a scenario of a user 401 (FIG. 4) attempting to authenticate in for a payment transaction different than that in FIG. 7A. As such, the second word string 720 is different from first prompt 710 in FIG. 7A. As described above, each authentication attempt by the user 401 (FIG. 4) may require the user to repeat a different word string. The word string 720 of FIG. 7B requests the user to speak "The flat upright sparkle shines." Also, the supplemental signal played back in FIG. 7B is different than the one played back in FIG. 7A, as the supplemental signal is unique to each payment transaction. In some embodiments, the user 401 (FIG. 4) may be presented with a progressive feedback indicator 620 indicating progress towards capturing the user's voice for authentication.

Figure 8:
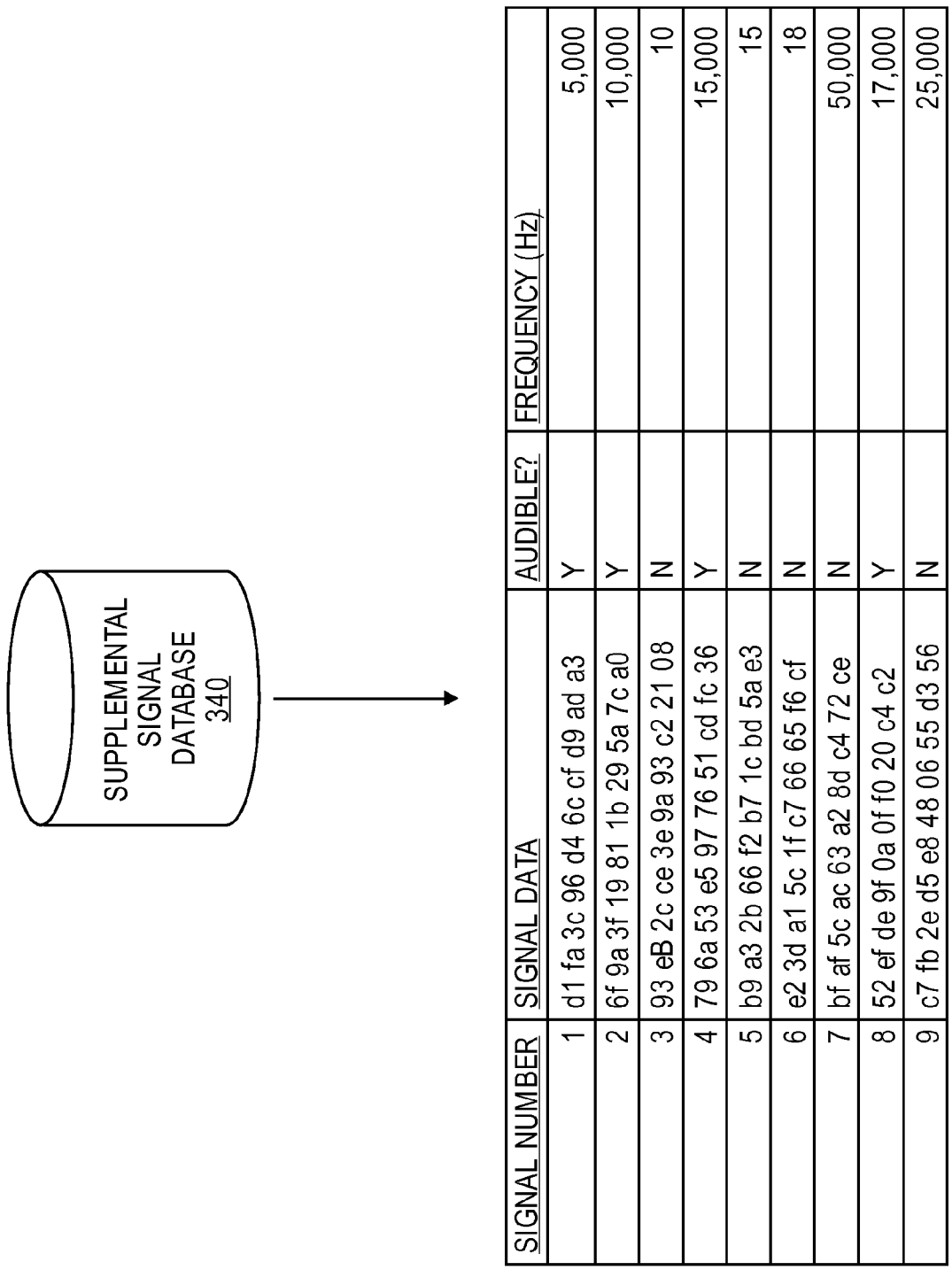
FIG. 8 illustrates contents of a supplemental signal database 340, according to an embodiment of the present invention.

FIG. 8 illustrates contents of a supplemental signal database 340, according to an embodiment of the present invention. In some embodiments, the supplemental signal database 340 may reside within the server computer 300 (FIG. 4). The supplemental signal database 340 is configured to store a plurality of supplemental signals to be transmitted during user authentication to the communication device 110 by the server computer 300. The supplemental signal database 340 may include attributes such as, but not limited to, the supplemental signal number, the supplemental signal data, information about whether the supplemental signal is audible or inaudible, and a frequency of the supplemental signal.

FIG. 8 shows data relating to nine different supplemental signals. Each of the nine supplemental signal data sets includes the attribute information mentioned above.

The signal number attribute of the supplemental signal database 340 indicates the number of the supplemental signal stored in the database 340. Each supplemental signal has a unique number assigned to it for identification purposes. It can be appreciated that while only nine supplemental signals are shown stored in the database 340, the database 340 may include millions or tens of millions of supplemental signals.

The time attribute of the user fraud profile 450 indicates the time of day on the date at which the user initiated the particular payment transaction.

The signal data attribute of the supplemental signal database 340 indicates the actual digital binary data that makes up the supplemental signal. As mentioned above, each supplemental signal is unique for each payment transaction and thus the digital binary data will be unique for each transaction. Even if one bit in the binary data for the supplemental signal is different than another supplemental signal, that supplemental signal is unique. The digital binary data may be converted to an analog audible or inaudible sound by the communication device 110 upon receiving the supplemental signal from the server computer 300.

The audible attribute of the supplemental signal database 340 indicates whether the supplemental signal is an audible or inaudible supplemental signal. In some embodiments, the frequency of the supplemental signal may determine whether the supplemental signal is audible or inaudible to the human user 401 (FIG. 4).

The frequency attribute of the supplemental signal database 340 indicates the frequency in Hertz of the supplemental signal. Supplemental signals played outside of the 20 Hz to 20,000 Hz range may be inaudible to the human user 401.

During user voice authentication, the server computer 300 may access a unique supplemental signal (one that hasn't been used for authentication before) from the supplemental signal database 340 and transmit it to the communication device 110. As described above, the communication device 110 may playback the received supplemental signal while concurrently or substantially simultaneous capture the user voice data and the supplemental signal being played back. The communication device 110 may transmit the user voice data and the supplemental signal (collectively as the audio segment) to the payment processor network who may verify with the server computer 300 that the supplemental signal captured by the communication device 110 does in fact match the supplemental signal originally pulled from the supplemental signal database 240 and transmitted to the communication device 110 by the server computer 300. The server computer 300 may access the supplemental signal database 340 again when making this determination.

II. Exemplary Methods

Figure 9:
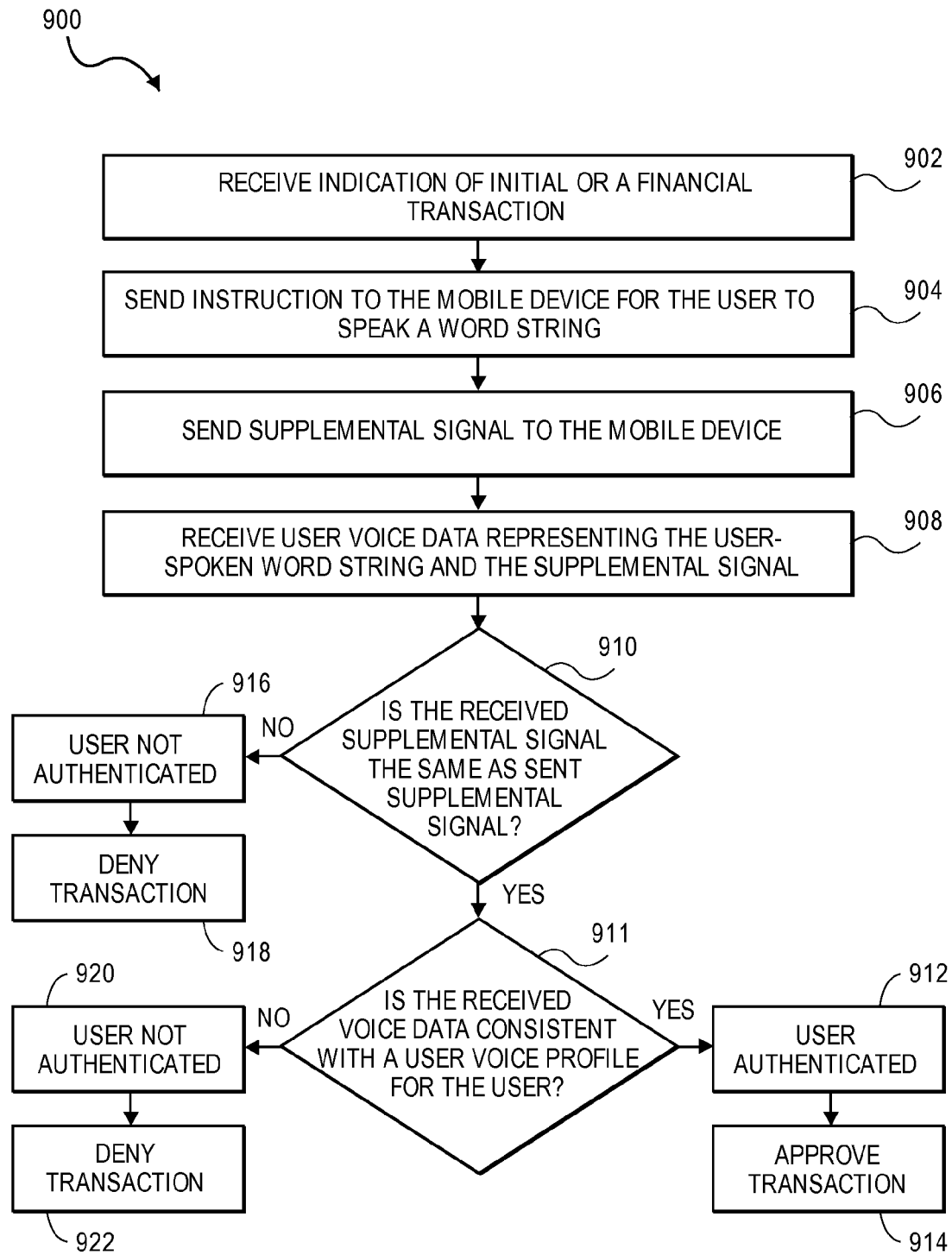
FIG. 9 is a flow diagram illustrating a method 900 for authenticating a user for a transaction, according to an embodiment of the present invention.

FIG. 9 is a flow diagram illustrating a method 900 for authenticating a user for a transaction, according to an embodiment of the present invention. The method 900 is performed by processing logic that may comprise hardware (circuitry, dedicated logic, etc.), software (such as is run on a general purpose computing system or a dedicated machine), firmware (embedded software), or any combination thereof. In certain embodiments, the method 900 is performed by the server computer 300 or the payment processing network 140 of FIG. 4.

The method 900 may begin when a user initiates a financial transaction using his or her communication device. Alternatively, the user may initiate the financial transaction at an access device. Upon the user initiating the financial transaction, the server computer may receive an indication that the financial transaction has been initiated by the user (Step 902).

After the server computer receives indication of a financial transaction, the server computer may send a message to the communication device instructing the user to speak a word string associated with his/her account (Step 904). The word string may random and unique to the particular financial transaction. For example, the word string may be "All dogs like to eat." The user may attempt to reproduce the word string with his or her voice in order to perform voice authentication with the system.

After the server computers sends a message to the communication device instructing the user to speak the word string, the server computer may send a supplemental signal to the communication device (Step 906). The supplemental signal may be received from a supplemental signal database residing within the server computer. The supplemental signal may be outputted by the communication device while the user attempts to perform the voice authentication by speaking the prompted word string. The communication device may then capture the user's rendition of the phrase/code word as well as the supplemental signal. In some embodiments, the supplemental signal may be an inaudible sound or an audible sound.

After the server computer sends the supplemental signal to the communication device, the server computer may receive the user-spoken reproduction of the word string and the supplemental signal from the communication device (Step 908). The user-spoken reproduction of the word string and the supplemental signal may be received in the same audio segment, as they may have been captured simultaneously by the communication device. The supplemental signal may have been captured at the same time while it had been outputted by the communication device.

After the server computer receives the audio segment including the user-spoken reproduction of the word string and the supplemental signal, the server computer may then compare the received supplemental signal with the initially sent supplemental signal sent to the communication device by the server computer (Step 910). The server computer may access the supplemental signal database to determine whether the received supplemental signal matches the initially sent supplemental signal. If the sent supplemental signal and the received supplemental signal do not match, the server computer may indicate to the payment processing network that the user is not authenticated (Step 916). In turn, the payment processing network may deny the payment transaction (Step 918).

If the sent supplemental signal and the received supplemental signal match, the server computer may then compare the received voice data with a user voice profile for the user to determine whether the received voice data is consistent with previous voice data stored for the user (Step 911). The server computer may access entries within a user voice profile database associated with the user to make this determination. If the received voice data is determined to be consistent with the user voice profile, the server computer may authenticate the user (Step 912) and communicate the authentication result to the payment processing network. In turn, the payment processing network may approve and process the transaction (Step 914). If the two the received voice data is determined to not be consistent with the user voice profile, the server computer may indicate to the payment processing network that the user is not authenticated (Step 920). In turn, the payment processing network, may conclude that the user cannot be authenticated and may deny the transaction (Step 922). In some embodiments, the server computer may request the user to re-speak the word string and send another supplemental signal to start the process over.

In another embodiment, the server computer may send the communication device a string of related or unrelated alphabets, numbers, words, or combination thereof. Thereafter, the server computer may highlight or visually emphasize certain alphabets, words, or numbers from the sent information and ask the user to repeat only the visually emphasized characters. For example, the payment processing network may send the following character string to the communication device "h3e4lu89l2j6o". Thereafter, the user may be asked to only repeat back the visually emphasized characters. In this example, the characters "h", "e", "l", "l", "o" are visually emphasized (bolded), so the user will repeat these characters back to the communication device. The communication device will then capture this audio along with the inaudible sound described above and send that information to the server computer for authentication. The server computer can verify whether the user has correctly repeated the visually highlighted characters and also compare the received inaudible sound with a previously sent inaudible sound to perform user authentication according to any of the techniques described above.

In an embodiment, the user may be asked to repeat certain words/characters displayed on the communication device at a particular pace/speed. The pace/speed can be determined by the server computer. For example, certain characters or words may be displayed to the user on his/her communication device based on a certain tempo and the user may be asked to repeat those characters/words at the same or substantially similar tempo. If the input received from the user is within a margin of error for the desired tempo, the user can be authenticated. In other embodiments, the user may be asked to enter a personal identification number (PIN) in addition to the voice data and the supplemental signal and all of these may be transmitted to the server computer or payment processing network for use in authenticating the user.

In still other embodiments, the user may communicatively couple a contactless card with his communication device to transfer information from the contactless card to the communication device. This can be done in addition to capturing the supplemental signal.

It should be appreciated that the specific steps illustrated in FIG. 9 provide a particular method for authenticating a user for a transaction at a communication device using speaker verification, according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 900.

I. Exemplary Systems

Figure 10:
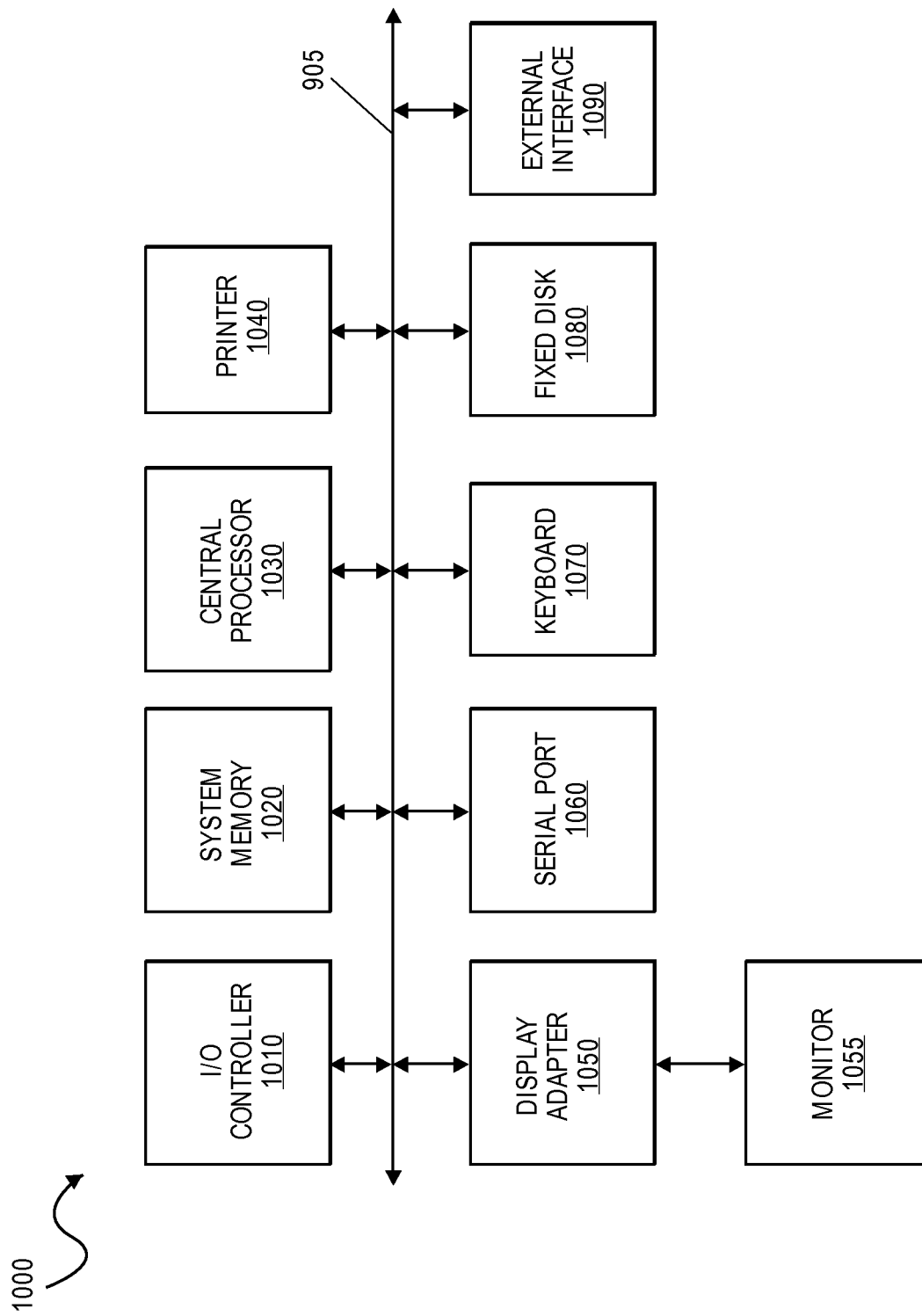
FIG. 10 is a diagram of a computer apparatus 1000, according to an example embodiment.

FIG. 10 is a diagram of a computer apparatus 1000, according to an example embodiment. The various participants and elements in the previously described system diagram (e.g., the communication device, payment processing network, acquiring bank, issuing bank, etc., in FIG. 1 or the server computer in FIG. 3) may use any suitable number of subsystems in the computer apparatus to facilitate the methods and/or functions described herein. Examples of such subsystems or components are shown in FIG. 10. The subsystems shown in FIG. 10 are interconnected via a system bus 1005. Additional subsystems such as a printer 1040, keyboard 1070, fixed disk 1080 (or other memory comprising computer-readable media), monitor 1055, which is coupled to display adapter 1050, and others are shown. Peripherals and input/output (I/O) devices (not shown), which couple to I/O controller 1010, can be connected to the computer system by any number of means known in the art, such as serial port 1060. For example, serial port 1060 or external interface 1090 can be used to connect the computer apparatus to a wide area network such as the Internet, a mouse input device, or a scanner. Alternatively, peripherals can be connected wirelessly (e.g., IR, Bluetooth, etc.). The interconnection via system bus allows the central processor 1030 to communicate with each subsystem and to control the execution of instructions from system memory 1020 or the fixed disk 1080, as well as the exchange of information between subsystems. The system memory 1020 and/or the fixed disk 1080 (e.g., hard disk, solid state drive, etc.) may embody a computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

One or more embodiments of the invention may be combined with one or more other embodiments of the invention without departing from the spirit and scope of the invention.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for authenticating a user for a transaction, comprising:
receiving, by a device, a user request to initiate the transaction;
transmitting, by the device and to a server computer, a notification of the user request to the initiate the transaction;
in response to transmitting the notification to the server computer, receiving, by the device and from the server computer, a supplemental signal comprising an inaudible sound and an element unique to the transaction;
in response to receiving the supplemental signal, displaying, by the device, a word string to be repeated by the user, wherein the word string comprises a random element and a fixed element;
playing, by the device, the received supplemental signal;

concurrently recording, by the device, (a) an audio segment originating from the user while the user attempts to vocally reproduce the displayed word string and (b) the received supplemental signal; and sending, by the device, the concurrently recorded audio segment and the received supplemental signal, to the server computer, wherein the server computer authenticates the user based at least in part on (a) the sent audio segment matching with a voice profile associated with the user and (b) the supplemental signal sent by the device matching the supplemental signal originally received by the device.

2. The method of claim 1 wherein the supplemental signal is played by a point-of-sale (POS) device while authenticating the user for the transaction.

3. The method of claim 1, wherein the inaudible sound comprises frequency components inaudible to a human being.

4. The method of claim 1, wherein the element unique to the transaction comprises at least one of a unique frequency, a unique pitch, or a unique speed of the supplemental signal.

5. A device, comprising:
a processor; and
a non-transitory computer-readable storage medium, comprising code executable by the processor for implementing a method for authenticating a user for a transaction, the method comprising:
receiving, by the device, a user request to initiate the transaction;
transmitting, by the device and to a server computer, a notification of the user request to the initiate the transaction;
in response to transmitting the notification to the server computer, receiving, by the device and from the server computer, a supplemental signal comprising an inaudible sound and an element unique to the transaction;
in response to receiving the supplemental signal, displaying, by the device, a word string to be repeated by the user, wherein the word string comprises a random element and a fixed element;
playing, by the device, the received supplemental signal;
concurrently recording, (a) by the device, an audio segment originating from the user while the user attempts to vocally reproduce the displayed word string and (b) the received supplemental signal; and
sending, by the device, the concurrently recorded audio segment and the received supplemental signal, to the server computer, wherein the server computer authenticates the user based at least in part on (a) the sent audio segment matching with a voice profile associated with the user and (b) the supplemental signal sent by the device matching the supplemental signal originally received by the device.

6. The device of claim 5 wherein the supplemental signal is played by a point-of-sale (POS) device while authenticating the user for the transaction.

7. The method of claim 5, wherein the inaudible sound comprises frequency components inaudible to a human being.

8. The method of claim 5, wherein the element unique to the transaction comprises at least one of a unique frequency, a unique pitch, or a unique speed of the supplemental signal.

9. A method for authenticating a user for a transaction, comprising:
receiving, from a device and by a server computer, a request to initiate the transaction;
transmitting, by the server computer and to the device, a supplemental signal comprising an inaudible sound and an element unique to the transaction;
receiving, by the server computer, authorization request comprising an (a) audio segment and (b) the transmitted supplemental signal, wherein the audio segment and the transmitted supplemental signal were concurrently recorded by the device while the device plays the transmitted supplemental signal and while the user attempts to vocally reproduce a word string displayed by the device, and wherein the word string comprises a random element and a fixed element;
verifying, by the server computer, that (a) the supplemental signal received in the authorization request matches the supplemental signal originally transmitted to the device and (b) that the received audio segment matches with a voice profile associated with the user; and
authenticating, by the server computer, the user for the transaction based at least in part on the verifying.

10. The method of claim 9 further comprising generating, by the server computer, the supplemental signal.

11. The method of claim 9 further comprising, receiving, a payment authorization request associated with the transaction, the payment authorization request including the concurrently recorded audio segment and supplemental signal.

12. The method of claim 9, wherein the inaudible sound comprises frequency components inaudible to a human being.

13. The method of claim 9, wherein the element unique to the transaction comprises at least one of a unique frequency, a unique pitch, or a unique speed of the supplemental signal.

14. A server computer, comprising:
a processor; and
a non-transitory computer-readable storage medium, comprising code executable by the processor for implementing a method for authenticating a user for a transaction, the method comprising:
receiving, from a device and by the server computer, a request to initiate a transaction;
transmitting, by the server computer and to the device, a supplemental signal comprising an inaudible sound and an element unique to the transaction;
receiving, by the server computer, an authorization request comprising an (a) audio segment and (b) the transmitted supplemental signal, wherein the audio segment and the transmitted supplemental signal were concurrently recorded by the device while the device plays the transmitted supplemental signal and while the user attempts to vocally reproduce a word string displayed by the device, and wherein the word string comprises a random element and a fixed element; and
verifying, by the server computer, that (a) the supplemental signal received in the authorization request matches the supplemental signal originally transmitted to the device and (b) that the received audio segment matches with a voice profile associated with the user; and
authenticating, by the server computer, the user for the transaction based at least in part on the verifying.

15. The server computer of claim 14 wherein the method further comprises generating, by the server computer, the supplemental signal.

16. The server computer of claim 14 wherein the method further comprises, receiving, a payment authorization request associated with the transaction, the payment authorization request including the concurrently recorded audio segment and supplemental signal.

17. The method of claim 14, wherein the inaudible sound comprises frequency components inaudible to a human being.

18. The method of claim 14, wherein the element unique to the transaction comprises at least one of a unique frequency, a unique pitch, or a unique speed of the supplemental signal.

* * * * *